United States Patent
Yoneda et al.

(10) Patent No.: US 12,222,708 B2
(45) Date of Patent: Feb. 11, 2025

(54) CONTROL SYSTEM

(71) Applicant: OMRON CORPORATION, Kyoto (JP)

(72) Inventors: Mitsuhiro Yoneda, Otsu (JP); Nobuyuki Sakatani, Otsu (JP); Ryota Akai, Kyoto (JP); Taiga Niimi, Kusatsu (JP); Shigenori Sawada, Takatsuki (JP)

(73) Assignee: OMRON CORPORATION, Kyoto (JP)

( * ) Notice: Subject to any disclaimer, the term of this patent is extended or adjusted under 35 U.S.C. 154(b) by 498 days.

(21) Appl. No.: 17/434,826

(22) PCT Filed: Feb. 18, 2020

(86) PCT No.: PCT/JP2020/006256
§ 371 (c)(1),
(2) Date: Aug. 30, 2021

(87) PCT Pub. No.: WO2020/184086
PCT Pub. Date: Sep. 17, 2020

(65) Prior Publication Data
US 2022/0147022 A1    May 12, 2022

(30) Foreign Application Priority Data

Mar. 14, 2019    (JP) .................. 2019-046796

(51) Int. Cl.
*G05B 19/418*    (2006.01)
*G05B 19/05*    (2006.01)

(52) U.S. Cl.
CPC .......... *G05B 19/4188* (2013.01); *G05B 19/05* (2013.01); *G05B 2219/1147* (2013.01)

(58) Field of Classification Search
CPC ............... G05B 19/4188; G05B 19/05; G05B 2219/1147
See application file for complete search history.

(56) References Cited

U.S. PATENT DOCUMENTS

| | | |
|---|---|---|
| 5,392,444 A | 2/1995 | Inoue |
| 2010/0199003 A1 | 8/2010 | Kitamura et al. |

(Continued)

FOREIGN PATENT DOCUMENTS

| | | |
|---|---|---|
| CN | 103155633 A | 6/2013 |
| CN | 103235748 A | 8/2013 |

(Continued)

OTHER PUBLICATIONS

Extended European Search Report dated Nov. 22, 2022 from the European Patent Office in EP Application No. 20770782.9.

(Continued)

*Primary Examiner* — Michael W Choi
(74) *Attorney, Agent, or Firm* — Sughrue Mion, PLLC

(57) ABSTRACT

A control system includes one or more control devices, and an information processing device. The information processing device and the one or more control devices are communicatively connected and time-synchronized with each other. The information processing device includes a processor configured to perform control calculation processing of calculating control data in accordance with control calculation based on data received from each of the one or more control devices. Each of the control devices includes a controller configured to perform input/output processing of transferring incoming data from a field device to the information processing device and outputting the control data received from the information processing device to the field device, and the control calculation processing and the input/output processing are performed within a period of time based on the time synchronization and shared between each of the control devices and the information processing device.

11 Claims, 21 Drawing Sheets

(56) References Cited

U.S. PATENT DOCUMENTS

| | | | |
|---|---|---|---|
| 2013/0131839 A1* | 5/2013 | Washington | G05B 15/02 |
| | | | 700/19 |
| 2013/0229907 A1 | 9/2013 | Wen et al. | |
| 2013/0254584 A1 | 9/2013 | Tamaoki | |
| 2014/0012402 A1* | 1/2014 | Nishiyama | G05B 19/0426 |
| | | | 700/86 |
| 2015/0277411 A1 | 10/2015 | Nakajima et al. | |
| 2016/0124413 A1* | 5/2016 | Lee | G05B 19/05 |
| | | | 700/75 |
| 2016/0292110 A1* | 10/2016 | Niwa | G05B 19/054 |
| 2018/0259929 A1 | 9/2018 | Eguchi et al. | |
| 2018/0281187 A1* | 10/2018 | Lee | G06F 9/545 |

FOREIGN PATENT DOCUMENTS

| | | | |
|---|---|---|---|
| CN | 103261983 A | 8/2013 | |
| CN | 109159125 A | 1/2019 | |
| JP | 63-310004 A | 12/1988 | |
| JP | 2004-326531 A | 11/2004 | |
| JP | 2010-182101 A | 8/2010 | |
| JP | 2015184987 A | 10/2015 | |
| JP | 2018-073436 A | 5/2018 | |
| JP | 2018-151726 A | 9/2018 | |
| WO | 2014/108999 A1 | 7/2014 | |

OTHER PUBLICATIONS

Japanese Office Action dated Mar. 7, 2023 in Japanese Application No. 2021-208133.

International Search Report for PCT/JP2020/006256 dated Apr. 21, 2020 [PCT/ISA/210].

Written Opinion for PCT/JP2020/006256 dated Apr. 21, 2020 [PCT/ISA/237].

Chinese Office Action dated Nov. 15, 2023 in Chinese Application No. 202080017653.4.

Office Action issued Jul. 5, 2024 in Chinese Application No. 202080017653.4.

Office Action issued Nov. 27, 2024, in Chinese Application No. 202080017653.4.

\* cited by examiner

CONTROL SYSTEM

CROSS REFERENCE TO RELATED APPLICATIONS

This application is a National Stage of International Application No. PCT/JP2020/006256 filed Feb. 18, 2020, claiming priority based on Japanese Patent Application No. 2019-046796 filed Mar. 14, 2019, the entire contents of each of which being herein incorporated by reference in their entireties.

TECHNICAL FIELD

The present disclosure relates to a control system that controls a control target.

BACKGROUND ART

For factory automation (FA) applied to a production line, a control device such as a programmable logic controller (PLC) is used. Such a control device transmits and receives data to and from a control target, which is one or more field devices provided in the production line, over a bus or a network. The control device performs control calculation processing in accordance with to a user program (hereinafter may be abbreviated as UPG) using data received from the field device, and transmits control data obtained as a result of the processing to the field device. The field device is controlled in accordance with the control data, and outputs data obtained as a result of the control to the control device.

In recent years, with an increase in sophistication of FA systems, efficient system operation has been required. For example, as disclosed in PTL 1 (Japanese Patent Laying-Open No. 2018-73436), parameters for each control device are set by a server communicatively connected to the control devices over a network, which enables simple parameter management.

CITATION LIST

Patent Literature

PTL 1: Japanese Patent Laying-Open No. 2018-73436

SUMMARY OF INVENTION

Technical Problem

Further, the increase in sophistication of FA systems increases the throughput or processing time required for the control calculation processing in accordance with the UPG. It is therefore desired to take measures to achieve efficient system operation even with an increase in the throughput or processing time required for the control calculation processing of the UPG. PTL 1 discloses a configuration related to parameter setting, but does not propose a technique for enabling efficient system operation even with an increase in the throughput or processing time required for the control calculation processing of the UPG.

It is therefore an object of the present disclosure to provide a control system that enables efficient system operation with regard to control calculation processing.

Solution to Problem

An example of the present disclosure is a control system including one or more control devices, and an information processing device. In the control system, the information processing device and the one or more control devices are communicatively connected and time-synchronized with each other, the information processing device includes a processor configured to perform control calculation processing of calculating control data in accordance with control calculation based on data received from each of the one or more control devices, each of the control devices includes a controller configured to perform input/output processing of transferring incoming data from a field device to the information processing device and outputting the control data received from the information processing device to the field device, and the control calculation processing and the input/output processing are performed within a period of time based on the time synchronization and shared between each of the control devices and the information processing device.

According to the above-described disclosure, the control system including the information processing device and the control device that are time-synchronized with each other is provided with an environment where the control calculation processing of the information processing device and the input/output processing of the control device are performed in a coordinated manner within the shared period of time. Accordingly, the control device need not be provided with the runtime environment of the control calculation processing, so that the control device can control the field device (independently) without being restricted by the throughput or processing time required for the control calculation processing.

According to the above-described disclosure, the processing to be performed by the processor further includes processing of increasing the shared period of time when a part of the shared period of time in which the control calculation processing is performed is insufficient.

According to the above-described disclosure, it is possible to set aside a period of time for performing the control calculation processing within the shared period of time.

According to the above-described disclosure, the shared period of time includes a control period, and the input/output processing includes processing of transferring, in a control period, the incoming data for a plurality of control periods before the control period to the information processing device and outputting the control data for the plurality of control periods received from the information processing device to the field device.

According to the above-described disclosure, the control device collectively transmits the incoming data for the plurality of control periods to the information processing device, so that the communication time between the information processing device and the control device can be reduced as compared with a case where the incoming data is transmitted every control period. Further, since data for the plurality of control periods is communicated, even when data drops off (data is lost) for a certain control period, it is possible to use data for another control period to complement the lost data.

According to the above-described disclosure, the shared period of time includes a control period, and the input/output processing includes processing of transferring the incoming data for one control period to the information processing device and outputting the control data for a plurality of control periods to the field device, the control data being received from the information processing device and based on the incoming data.

According to the above-described disclosure, the control device can acquire the control data for the plurality of control periods by transmitting the incoming data for one control period to the information processing device.

According to the above-described disclosure, the input/output processing includes processing of outputting, upon receipt of the control data for the plurality of control periods from the information processing device in a control period, each piece of the control data for the plurality of control periods to the field device in a plurality of control periods after the control period.

According to the above-described disclosure, the information processing device collectively transmits the control data for the plurality of control periods to the control device, so that the communication time between the information processing device and the control device can be reduced as compared with a case where the control data is transmitted every control period. Further, since data for the plurality of control periods is communicated, even when data drops off (data is lost) for a certain control period, it is possible to use data for another control period to complement the lost data.

According to the above-described disclosure, the information processing device and each of the control devices start processing in response to a common trigger received within the shared period of time, and the information processing device performs preparation processing for the control calculation processing within a certain period of time earlier than a reception start time of the data predicted based on a reception time of the trigger and a period of time required for the input/output processing.

According to the above-described disclosure, it is possible to set aside a period of time for performing the preparation processing before the start of the control calculation processing.

According to the above-described disclosure, the preparation processing includes processing of disabling information processing other than the control calculation processing.

According to the above-described disclosure, the other information processing is disabled until the control calculation processing is started, so that a resource for the subsequent control calculation processing can be reliably prepared.

According to the above-described disclosure, a plurality of the control devices are communicatively connected to the information processing device, the control calculation processing includes a plurality of pieces of control calculation processing each provided for a corresponding one of the plurality of control devices, and the processor has a first mode in which the processor starts the plurality of pieces of control calculation processing upon receipt of data from the plurality of control devices, or a second mode in which the processor starts, upon receipt of data from one of the plurality of control devices, the control calculation for the control device.

According to the above-described disclosure, in the information processing device, as a mode in which the plurality of pieces of control calculation processing are started, provided is the above-described first mode in which the plurality of pieces of control calculation processing are started in synchronization or the above-described second mode in which the plurality of pieces of control calculation processing are asynchronously started (upon receipt of data from a corresponding control device) without synchronization.

According to the above-described disclosure, when the processor has the first mode and the second mode, the processor enables either the first mode or the second mode in accordance with an external instruction.

According to the above-described disclosure, the information processing device can enable either the first mode or the second mode in accordance with an instruction from the outside.

According to the above-described disclosure, a plurality of the field devices are connected to each of the control devices over a field network, and in the input/output processing, the controller collects the incoming data from the plurality of field devices and transfers the control data received from the information processing device to the plurality of field devices over the field network.

According to the above-described disclosure, in the input/output processing, the control device can collect the incoming data from the field devices and transfer the control data received from the information processing device to the plurality of field devices.

According to the above-described disclosure, a plurality of the control devices are communicatively connected to the information processing device and include a control device serving as an active system and a control device serving as a standby system, the control device serving as the standby system is put into operation at a predetermined timing, and the information processing device switches from data communication with the control device serving as the active system to data communication with the control device serving as the standby system at the predetermined timing.

According to the above-described disclosure, the plurality of control devices included in the control system can serve as either the active system or the standby system, and the control device serving as the standby system can be switched to the active system at the predetermined timing. In a case where the predetermined timing includes the occurrence of a failure, the control system can be kept in operation even after the occurrence of a failure.

Advantageous Effects of Invention

According to the present disclosure, it is possible to provide a control system that enables efficient system operation with regard to control calculation processing.

DESCRIPTION OF EMBODIMENTS

Figure 1:
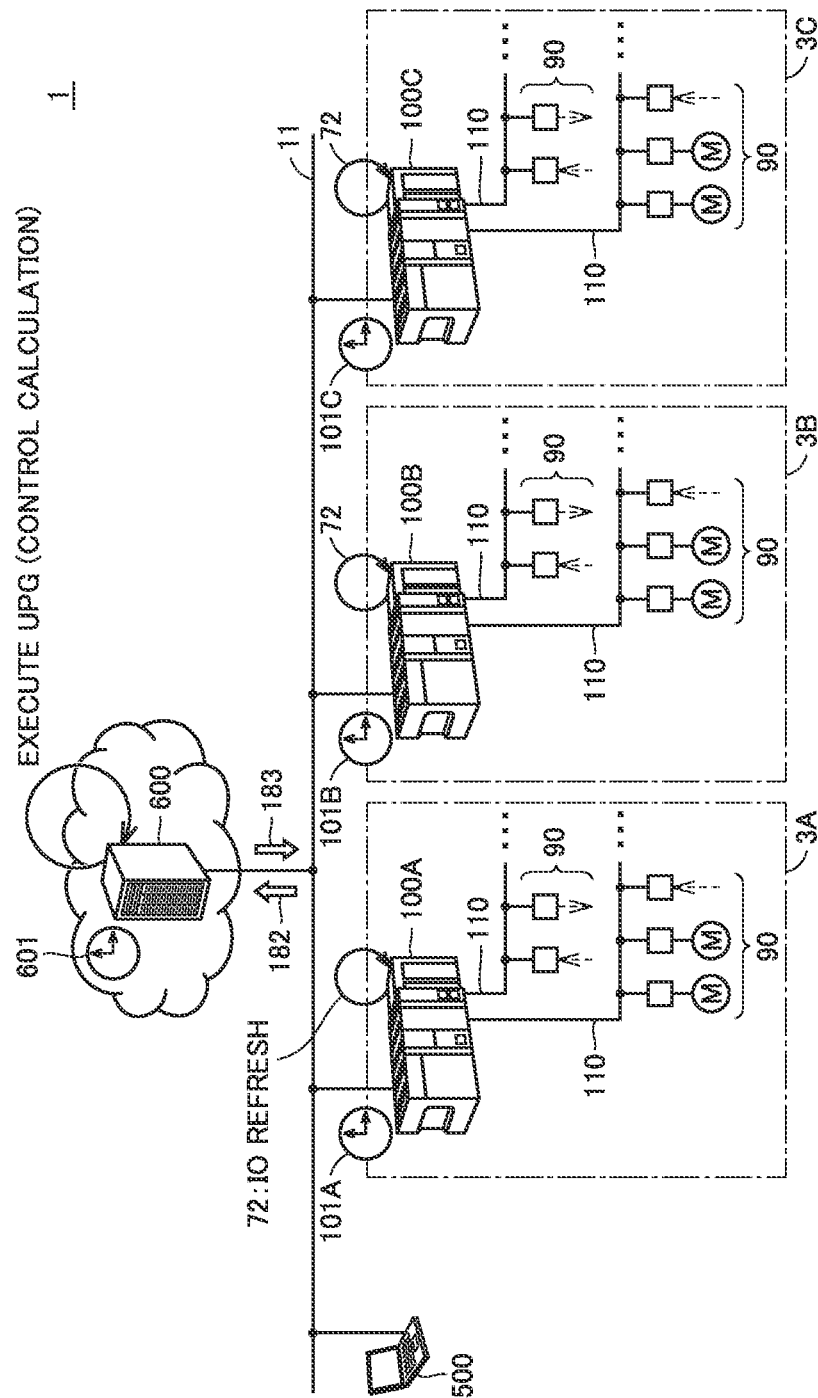
FIG. 1 is a diagram schematically illustrating an example of a configuration of a control system 1 according to the present embodiment.

The present embodiment will be described in detail with reference to the drawings. Note that the same or corresponding parts in the drawings are denoted by the same reference numerals, and no redundant description will be given of such parts.

A. Application Example

First, an example of a case to which the present invention is applied will be described. FIG. 1 is a diagram schematically illustrating an example of a configuration of a control system 1 according to the present embodiment. Referring to FIG. 1, control system 1 applicable to FA includes, for example, PLCs 100A, 100B, and 100C that are examples of a "control device" and a server 600 that is an example of an "information processing device". PLCs 100A, 100B, and 100C have the same capability and are thus collectively referred to as a PLC 100 unless otherwise distinguished from each other. PLC 100 is connected to server 600 over a wired or radio network 11. Further, a support device 500 may be connected to network 11.

In FIG. 1, control system 1 has a configuration where PLC 100 and server 600 are separately provided, but not limited to such a configuration. For example, control system 1 may include an industrial computer (so-called industrial personal computer (IPC)) having the capability of PLC 100 and the capability of server 600.

PLCs 100A, 100B, and 100C, and server 600 are connected to network 11 so as to enable device-to-device data communication over network 11. Further, as server 600, a server in an FA system or a server outside the FA system such as a cloud server may be applied. When server 600 is an external server, network 11 includes an external network such as the Internet.

Field devices 90 of various types such as a sensor and an actuator are connected to PLC 100. Each of field devices 90 is an example of a "control target". Such field devices 90 may be directly connected to PLC 100 via an input/output unit attached to PLC 100, or may be connected to PLC 100 over a network 110 established on a field side. In FIG. 1, PLC 100 is connected to one or more networks 110. One or more field devices 90 are connected to each network 110. One or more field devices 90 each include an actuator that applies some physical action to a manufacturing device, a production line, or the like (hereinafter, collectively referred to as a "field"), an input/output device that exchanges information with the field, and the like.

Data to be exchanged between PLC 100 and each field device 90 over network 110 is updated at short intervals of several hundred microsecond order to several ten millisecond order. Note that such processing of updating data to be exchanged is performed by IO refresh processing 72. IO refresh processing 72 is example of "input/output processing".

Specifically, according to the present embodiment, PLC 100 is capable of creating a frame including a designated process variable. PLC 100 transfers (transmits) the frame thus created to server 600 over network 11. The process variable may conceptually include a set of values obtained as a result of continuous (or alternatively, discontinuous, at regular intervals,) observation of a temporal change in data (process variable) for any desired control target.

Herein, the "process variable" is a concept serving as a general term of values (real values) available in control calculation for PLC 100 and may typically include a value acquired from the control target and input for the control calculation (such as a measurement value acquired from the field).

In control system 1, a timer 601 of server 600, a timer 101A of PLC 100A, a timer 101B of PLC 100B, and a timer 101C of PLC 100C are time-synchronized with each other. Server 600 executes a user program (UPG) 69 using input data (transmission) 182 corresponding to the process variables received from PLCs 100A, 100B, and 100C to perform control calculation processing based on input data (transmission) 182. Server 600 transmits, to PLC 100, output data (reception) 183 that is a calculated value obtained as a result of the control calculation processing. The calculated value corresponds to an example of "control data" on field device 90, and indicates, for example, a manipulated variable, a control variable, or the like. Each PLC 100 performs IO refresh processing 72 of collecting incoming data corresponding to the process variable from field device 90, transferring the incoming data to server 600, and outputting the control data received from server 600 to field device 90. The control calculation processing via the execution of UPG 69 in server 600 and IO refresh processing 72 in each PLC 100 are performed within a period of time based on the time synchronization and shared between each PLC 100 and server 600.

In FIG. 1, server 600 and PLC 100 exchange data within the shared period of time based on the time synchronization to put coordinated control into effect. Specifically, within this shared period of time, the following processing is sequentially performed:

(i) PLC 100 collects output data (process variable) from field device 90 by IO refresh processing 72, (ii) server 600 performs the control calculation processing based on the data output from field device 90 and collected by IO refresh processing 72, and (iii) PLC 100 outputs the calculated value (manipulated variable, control variable) from server 600 to field device 90 by IO refresh processing 72. In control system 1, a runtime environment of UPG 69 is provided not in PLC 100 but in server 600. It is therefore possible to execute, under the coordinated control, UPG 69 requiring computational complexity and computational speed exceeding the throughput (so-called specification) of PLC 100 and control field device 90 using a result of the execution.

A description will be given below of a more specific application example of the present embodiment.

B. Network Configuration of Control System 1

Referring again to FIG. 1, PLCs 100A, 100B, and 100C connected to network 11 of control system 1 are provided for processes 3A, 3B, and 3C, respectively. Processes 3A, 3B, and 3C may be, but not limited to, the same process (for example, a process of assembling workpieces into a product, or the like) or different processes (the process of assembling workpieces, a process of painting the assembly product, a process of inspecting the painted product, and the like).

A protocol used on network 11 may be, but not limited to, for example, EtherNet/IP (registered trademark), which is an industrial open network that adapts a control protocol to standard Ethernet (registered trademark). Further, a protocol used on network 110 may be, but not limited to, EtherCAT (registered trademark), which is an example of a machine control network. Note that the protocol used on network 11 and the protocol used on network 110 may be the same or different. Alternatively, network 110 may be implemented as a data bus.

Further, support device 500 provides a support tool that supports the user in operating control system 1. The support tool includes a tool that supports setting of preparation for the runtime environment of UPG 69 in server 600, an environment for communication with PLC 100, and the like. Support device 500 may be connected to network 11 or may be detachably connected to server 600, or alternatively, a support tool may be installed in server 600. Further, the support tool may include a tool that supports, for example, setting of preparation necessary for PLC 100 to control field device 90, or setting of preparation for an environment for communication with server 600 or the like, which allows support device 500 to be detachably connected to PLC 100. Note that the support tool is provided to the user via, for example, a user interface (UI).

C. Time Synchronization in Control System 1

In control system 1 in FIG. 1, PLCs 100A, 100B, and 100C connected to network 11 transmit and receive data to and from one or more field devices 90 connected over network 110. Specifically, PLC 100 performs the input/output processing (IO refresh processing 72) of transferring incoming data from field device 90 to server 600 and outputting control data received from server 600 to field device 90.

Further, network 110 must guarantee an arrival time of data. Therefore, PLC 100 includes a timer that provides a timing for data transmission and is time-synchronized with entities (that is, one or more field devices 90 and server 600) to or from which data is transmitted or received.

Further, in control system 1 according to the present embodiment, the timers of plurality of PLCs 100 are time-synchronized with each other. This makes it possible to bring plurality of field devices 90 connected to different PLCs 100 under coordinated control between different processes.

A description will be given below of a time synchronization function provided by control system 1 according to the present embodiment.

(c1. Time Synchronization)

Figure 2:
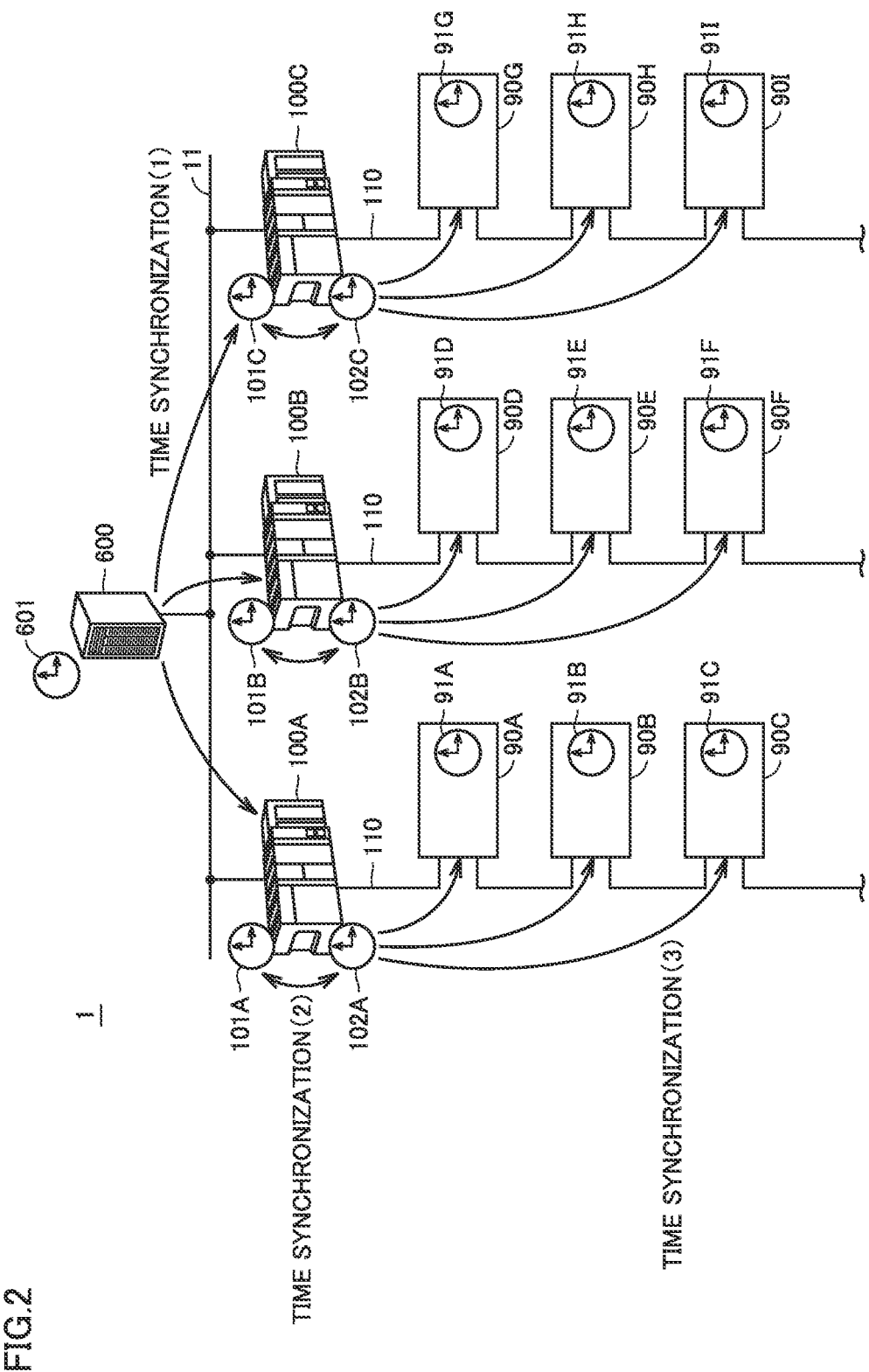
FIG. 2 is a schematic diagram illustrating an example of a network configuration of control system 1 according to the present embodiment.

FIG. 2 is a schematic diagram illustrating an example of a network configuration of control system 1 according to the present embodiment. A description will be given of time synchronization in control system 1 according to the present embodiment with reference to FIG. 2.

Control system 1 illustrated in FIG. 2 includes plurality of PLCs 100A, 100B, and 100C and a plurality of field devices 90A to 90I. In control system 1, PLCs 100A, 100B, and 100C each serve as a master is responsible for managing data transmission over corresponding network 110. Field devices 90A to 90I each serve as a slave that transmits data in accordance with an instruction from a corresponding master.

In control system 1 according to the present embodiment, transmission/reception timings are synchronized among a plurality of devices connected to network 110, that is, PLC 100 and one or more field devices 90 (corresponding to time synchronization (3) in FIG. 2). Specifically, PLC 100 and field device 90 each include time-synchronized timer. Such a timer serves as a counter that is incremented or decremented in synchronization. PLC 100 and field device 90 each determine a data transmission or reception timing in accordance with a corresponding time-synchronized timer.

Note that, according to the present embodiment, the "timing" represents a timing, a period of time, or a time when some event occurs. Further, the "time synchronization" indicates synchronization among respective timers, time data, or the like included in devices. According to the present embodiment, this time synchronization may be achieved, for example, by data communication over networks 11, 110 in accordance with Time-Sensitive Networking (TSN).

In the example illustrated in FIG. 2, PLC 100A includes a timer 102A, and field devices 90A to 90C include timers 91A to 91C, respectively. Timer 102A of PLC 100A serves as a master, and timers 91A to 91C of field devices 90A to 90C operates based on the master, so that a value based on a timer value of timer 102A is set to timers 91A to 91C (brought into time synchronization).

As in PLC 100A, timer 102B included in PLC 100B and timers 91D to 91F included in field devices 90D to 90F are brought into time synchronization with each other. Further, as in PLC 100A, timer 102C included in PLC 100C and timers 91G to 91I included in field devices 90G to 90I are brought into time synchronization with each other.

This allows data transmission timings and the like between PLC 100 and field device 90 constituting network 110 to coincide with each other.

In the example illustrated in FIG. 2, PLC 100A includes timer 101A time-synchronized with timer 102A, PLC 100B includes timer 102B time-synchronized with timer 101B, and PLC 100C includes timer 102C time-synchronized with timer 101C (corresponding to time synchronization (2) in FIG. 2).

Further, in control system 1, timer 601 of server 600 serves as a master, timer 101A of PLC 100A, timer 101B of PLC 100B, and timer 101C of PLC 100C are time-synchronized with timer 601 serving as the master. This causes each PLC 100 to be time-synchronized with server 600 (corresponding to time synchronization (1) in FIG. 2).

Further, timer 101A of PLC 100A may be time-synchronized with timer 601 of server 600, and timers 100B, 101C of other PLCs 100B, 100C may be time-synchronized with timer 101A.

As a result, in control system 1, each PLC 100 and server 600 are time-synchronized with each other, and each PLC 100 and field device 90 connected to PLC 100 are time-synchronized with each other.

D. Configuration of Each Device

A description will be given of a configuration of each device included in control system 1.
(d1. Configuration of PLC 100)

Figure 3:
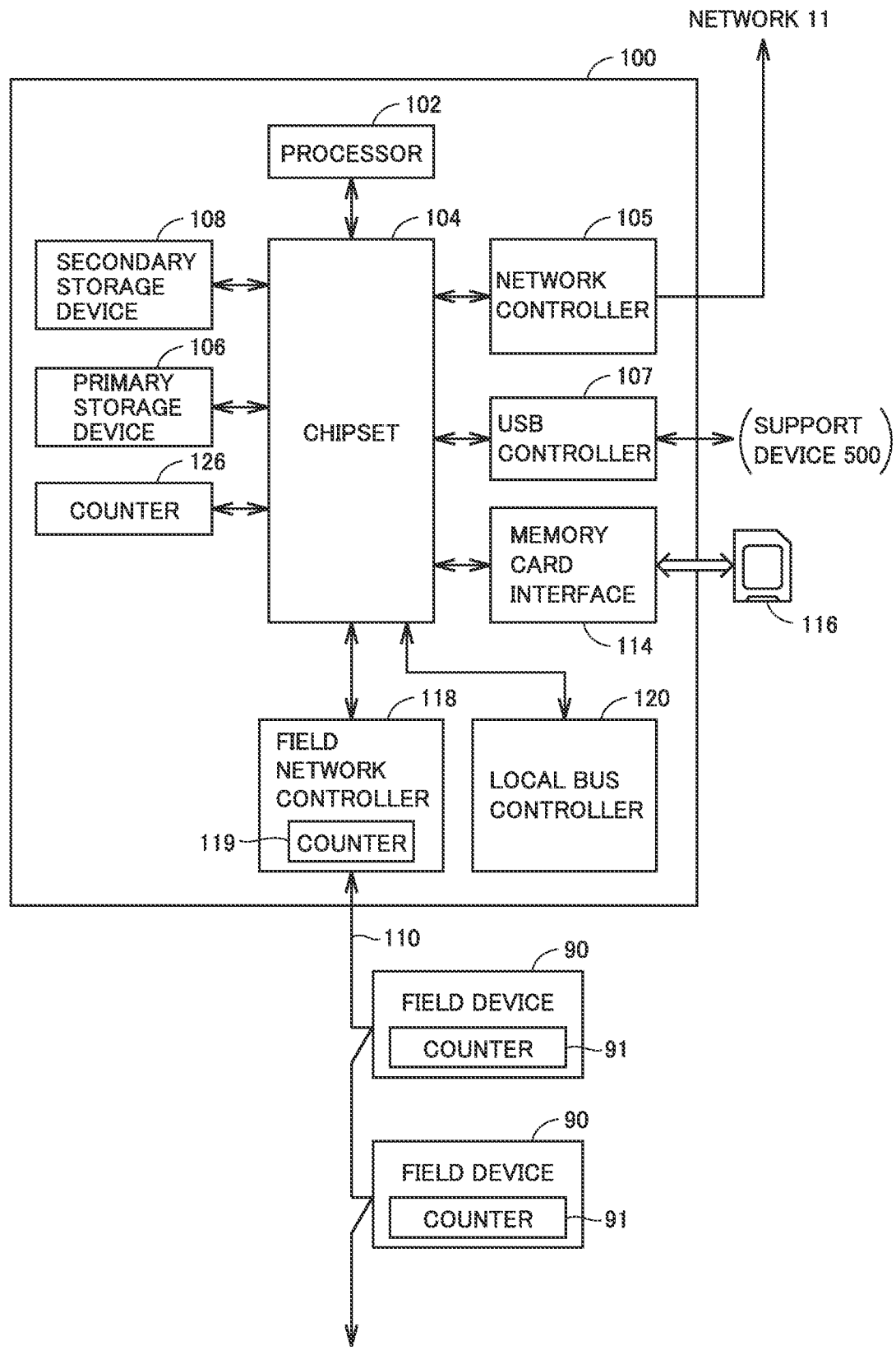
FIG. 3 is a block diagram illustrating an example of a configuration of a PLC 100 according to the present embodiment.

FIG. 3 is a block diagram illustrating an example of a configuration of PLC 100 according to the present embodiment. Referring to FIG. 3, PLC 100 includes a processor 102, a chipset 104, a primary storage device 106, a secondary storage device 108, a network controller 105 such as a network interface card (NIC), a universal serial bus (USB) controller 107, a memory card interface 114, a local bus controller 120, a field network controller 118, and a counter 126.

Processor 102 includes a central processing unit (CPU), a microprocessor unit (MPU), a graphics processing unit (UPG), or the like. Processor 102 reads various programs stored in secondary storage device 108 and loads and executes the programs thus read into primary storage device 106 to enable control and various processing as described later on the control target. Secondary storage device 108 includes, for example, a non-volatile storage device such as a hard disk drive (HDD) or a solid state drive (SSD). Primary storage device 106 includes a volatile storage device such as a dynamic random access memory (DRAM) or a static random access memory (SRAM).

Chipset 104 controls processor 102 and each device to enable processing all over PLC 100.

Secondary storage device 108 stores a user program created based on a manufacturing device or facility to be controlled, in addition to a system program responsible for providing basic functions.

Network controller 105 exchanges data with server 600 over network 11. USB controller 107 controls data exchanges with support device 500 over an USB connection.

Memory card interface 114 is configured to receive memory card 116 in a detachable manner and is capable of writing data to memory card 116 and reading various data (such as the user program or trace data) from memory card 116.

Counter 126 is a kind of timer. Counter 126 is used as a time reference for use in managing the execution timing at which various processing is performed in PLC 100. Counter 126 typically increments or decrements a counter value at predetermined intervals. Counter 126 may be implemented by a hardware timer provided on a system bus that drives processor 102, or may be implemented by a dedicated circuit such as an application specific integrated circuit (ASIC) or a field-programmable gate array (FPGA). Timers 101A, 101B, and 101C illustrated in FIG. 2 each corresponds to counter 126.

Field network controller 118 controls data exchanges with other devices including field device 90 over network 110. Field network controller 118 includes a counter 119 used as a time reference for use in managing the timing with the other devices. Timers 102A, 102B, and 102C illustrated in FIG. 2 each correspond to counter 119.

Local bus controller 120 is an interface that exchanges data with a function unit (not illustrated) connectable to PLC 100.

Further, each field device 90 on network 110 also includes a counter 91 used as a time reference for use in managing the timing with field network controller 118. Timers 91A to 911 in FIG. 2 each correspond to counter 92.

Counter 119 and the counter included in each field device 90 may be the same in configuration as counter 126 described above.

Field network controller 118 serves as a communication master to carry out communications at regular intervals over network 110. Field network controller 118 is responsible for synchronization management so as to make the counter value indicated by counter 91 of field device 90 equal to the counter value indicated by counter 119.

In PLC 100 in FIG. 3, counter 119 is synchronized with counter 126 by the above-described time synchronization.

FIG. 3 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of PLC 100 may be implemented by hardware having a general-purpose architecture (for example, an industrial personal computer based on a general-purpose personal computer). In this case, an environment that includes a multiprocessor and allows parallel execution is provided. Further, a plurality of operating systems (OSs) having different uses may be executed in parallel using a virtualization technology, and a necessary application may be executed on each OS.
(d2. Configuration of Server 600)

Figure 4:
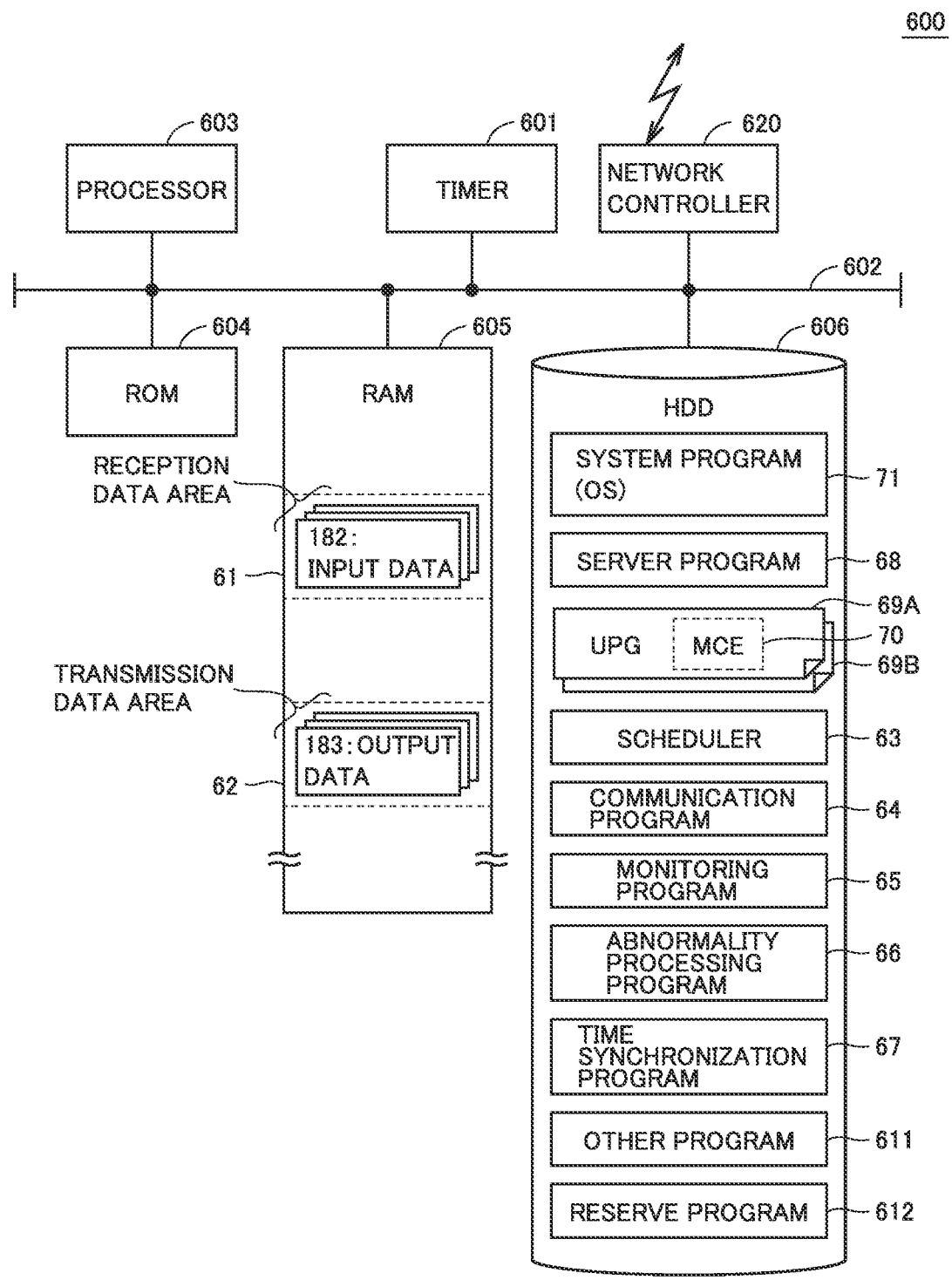
FIG. 4 is a diagram illustrating an example of a configuration of a server 600 according to the present embodiment.

FIG. 4 is a diagram illustrating an example of a configuration of server 600 according to the present embodiment. Server 600 has a configuration corresponding to a general-purpose computer. Referring to FIG. 4, server 600 includes timer 601, a processor 603 such as a CPU or an MPU, a storage device, and a network controller 620 for use in data exchanges with the other devices including PLC 100. Network controller 620 may include, for example, a NIC. These components are data-communicatively connected to each other over internal bus 602. The storage device includes a read only memory (ROM) 604, a random access memory (RAM) 605, and a hard disk drive (HDD) 606. Processor 603 may include a multiprocessor and be configured to execute UPGs 69 in parallel.

HDD 606 stores a system program 71 including an operating system (OS), a server program 68, UPGs 69A, 69B for the control calculation processing, a monitoring program 65 for monitoring an abnormality, an abnormality processing program 66 for handling an abnormality, a time synchronization program 67 for enabling the above-described time synchronization, a scheduler 63, a communication program 64, other program 611 for performing other processing different from the control calculation, and a reserve program 612 related to processing of setting aside a "preparation time" to be described later. Processor 603 loads and executes such programs in RAM 605.

According to the present embodiment, HDD 606 stores two types of user programs: UPG 69A for PLC 100A and UPG 69B for PLC 100B, but may store a UPG for PLC 100C in addition to UPGs 69A, 69B. Further, when a common user program is applied to PLCs 100A, 100B, and 100C, only one type of user program needs to be stored in HDD 606. UPGs 69A, 69B are referred to as UPG 69 unless otherwise distinguished from each other. UPG 69 may include a motion control engine (MCE) 70. MCE 70 is a program that creates (calculates) a manipulated variable for moving (driving) a robot along a desired path.

RAM 605 includes a reception data area 61 for storing input data (transmission) 182 to be described later and a transmission data area 62 for storing output data (reception) 183 to be described later. Input data (transmission) 182 and output data (reception) 183 each include an identifier of PLC 100 serving as a data transmission source or destination, a variable name, and data corresponding to the variable. Processor 603 stores input data (transmission) 182 received from PLC 100 via network controller 620 in reception data area 61. Further, processor 603 performs the control calculation processing using input data (transmission) 182 in reception data area 61, and stores output data (reception) 183, which is a calculated value, in transmission data area 62. The reception of input data (transmission) 182 and the transmission of output data (reception) 183 are performed by communication program 64 running on processor 603.

Further, the control calculation processing is performed by UPG 69 running on processor 603. UPG 69 may be defined by, for example, but not limited to, a ladder logic using function blocks or the like.

(d3. Software Configuration of PLC 100)

Figure 5:
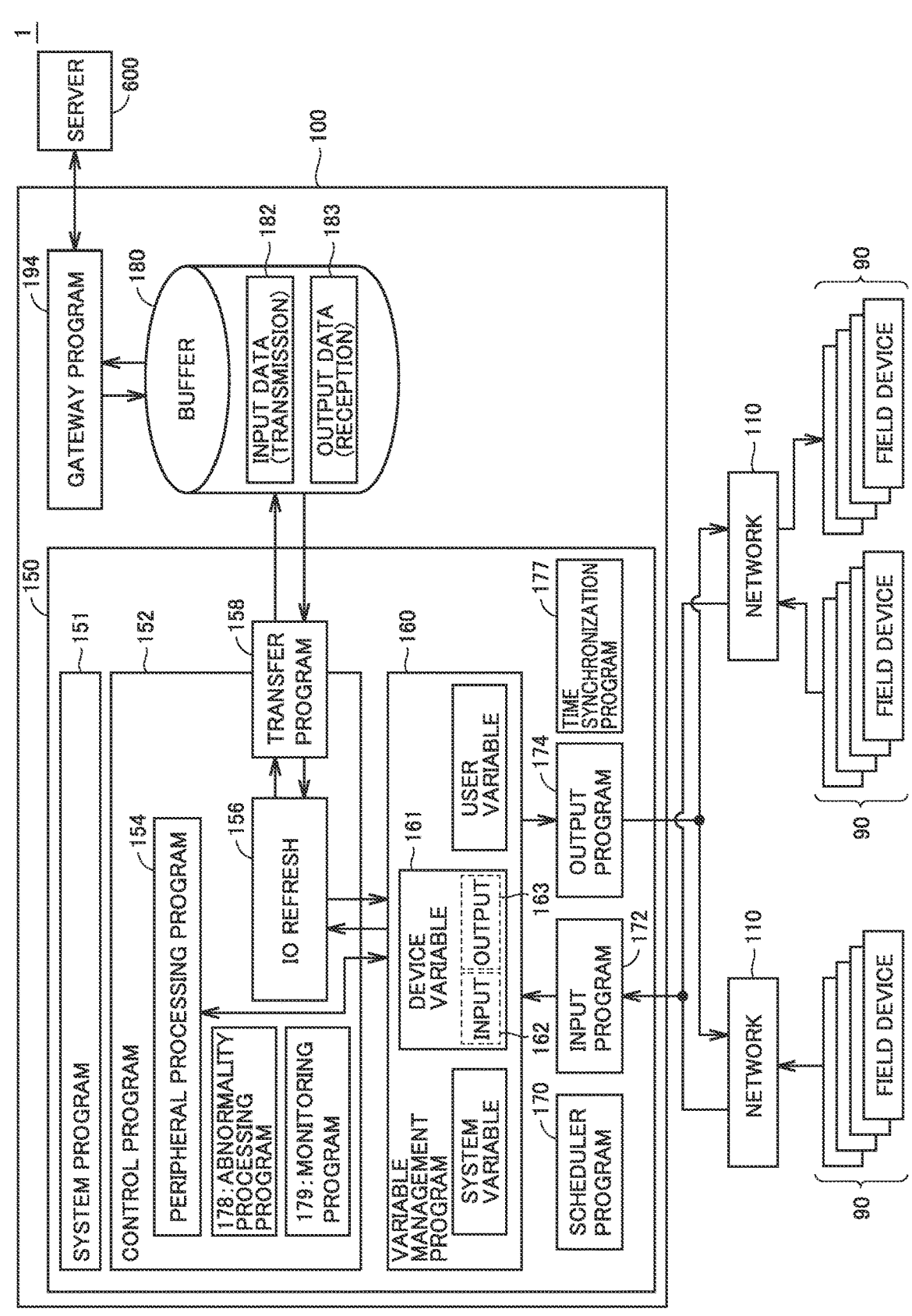
FIG. 5 is a block diagram illustrating an example of a software configuration of PLC 100 according to the present embodiment.

Next, a description will be given of an example of a software configuration of PLC 100 according to the present embodiment. FIG. 5 is a block diagram illustrating an example of a software configuration of PLC 100 according to the present embodiment. Referring to FIG. 5, PLC 100 includes a control engine 150, a buffer 180, and a gateway program 194. Buffer 180 may be typically provided in, for example, primary storage device 106 or secondary storage device 108, or in a memory included in network controller 105. Further, buffer 180 stores input data (transmission) 182 and output data (reception) 183.

Control engine 150 provides a runtime environment of various programs. Specifically, processor 102 of PLC 100 reads system program 151 stored in secondary storage device 108, loads system program 151 into primary storage device 106, and executes system program 151 to put control engine 150 into operation.

Control engine 150 executes a control program 152, a variable management program 160, a scheduler program 170, an input program 172, an output program 174, and a time synchronization program 177. Variable management program 160, scheduler program 170, input program 172, and output program 174 may be implemented as part of system program 151. In this case, each function provided by such programs may be provided by single system program 151.

Control program 152 includes a peripheral processing program 154, an IO refresh 156, a transfer program 158, an abnormality processing program 178, and a monitoring program 179 that are examples of programs provided by the user. Peripheral processing program 154 includes processing such as display processing and logging processing different from the control calculation processing performed by UPG 69 and executed around the control calculation processing. Note that the peripheral processing may conceptually include processing related to the control calculation processing performed by UPG 69.

Variable management program 160 manages values available in control engine 150 in the form of variables, for example, in a predetermined storage area of primary storage device 106. More specifically, variable management program 160 manages a system variable indicating a state of PLC 100 or the like, a device variable 161 indicating a value held by field device 90 connected to PLC 100 over network 110, and a user variable indicating a value held by peripheral processing program 154 executed by PLC 100. Device variable 161 includes a variable of input data 162 that is incoming data from field device 90 and output data 163 that is data to be output to field device 90. Output data (reception) 183 received from server 600 is set to an output variable of output data 163. A control variable of output data 163 and a process variable from field device 90 controlled in accordance with a manipulated variable is set to an input variable of input data 162.

Input program 172 receives input data 162 coming from field device 90 over network 110 and passes the input data to variable management program 160. Further, output program 174 outputs output data 163 passed from variable management program 160 to field device 90 over network 110.

Transfer program 158 creates input data (transmission) 182 by converting input data 162 passed from IO refresh 156 into a transmittable form, and stores the input data in buffer 180. Further, transfer program 158 converts output data (reception) 183 received from server 600 and stored in buffer 180 into output data 163 in a manipulatable form, and outputs output data 163 obtained as a result of the conversion to IO refresh 156. For example, input data (transmission) 182 indicates, but not limited to, data including process variables in chronological order from field device 90, and output data (reception) 183 indicates control data in chronological order to be output to field device 90.

IO refresh 156 performs IO refresh processing 72 in cooperation with variable management program 160. Specifically, IO refresh 156 reads output data (reception) 183 received from server 600 from buffer 180 via transfer program 158, and outputs output data (reception) 183 to variable management program 160. Further, IO refresh 156 receives input data 162 that is the value of the input variable of device variable 161 from variable management program 160, and stores, via transfer program 158, input data 162 thus received into buffer 180 as input data (transmission) 182.

Variable management program 160 sets the data passed from input program 172 as the input variable of device variable 161, and outputs input data 162 of the input variable to IO refresh 156. Further, variable management program 160 sets output data (reception) 183 from IO refresh 156 to the output variable of output data 163 of device variable 161, and passes output data 163 of the output variable to output program 174.

In IO refresh 156 described above, the variable value of input data 162 of device variable 161 is updated with the incoming data (process variable) from field device 90, and output data 163 is reflected (set) with the variable value serving as the manipulated variable and the control variable of device variable 161 to be output to field device 90. Therefore, IO refresh 156 enables the exchange of input data 162 (input data (transmission) 182) and output data 163 (output data (reception) 183) between PLC 100 and field device 90, more specifically, between server 600 and field device 90.

Gateway program 194 communicates with server 600. For example, gateway program 194 creates a frame from input data (transmission) 182 in buffer 180, and transmits the frame thus created to server 600. Further, gateway program 194 receives a frame from server 600, extracts the calculated value (manipulated variable, control variable) obtained as a result of the control calculation processing from the frame thus received, and stores the value thus extracted in buffer 180 as output data (reception) 183. Buffer 180 and gateway program 194 may be provided in network controller 105.

Time synchronization program 177 enables the above-described time synchronization with server 600 and field device 90, and manages the execution interval of control program 152 in PLC 100 based on the time synchronization.

Scheduler program 170 manages resource allocation, execution timing, and the like for a process, a task, or the like of PLC 100. Such a process or task includes a process or task that may be created by control program 152, variable management program 160, input program 172, output program 174, time synchronization program 177, abnormality processing program 178, monitoring program 179, and the like running on PLC 100. Scheduler program 170 adjusts the execution timing of each program based on, for example, a predetermined control period.

This allows PLC 100 to perform the peripheral processing and the IO refresh processing under control program 152 in a period of time based on the time synchronized with server 600 and field device 90.

(d4. Communication Master Processing)

PLC 100 performs communication master processing. In the communication master processing, PLC 100 serves as a communication master and controls, in IO refresh processing 72, the collection of the incoming data from plurality of field devices 90 and the transfer of the control data received from server 600 to plurality of field devices 90 over network 110.

Specifically, PLC 100 controls data communications between PLC 100 and field device 90 over network 110 in the communication master processing. In the communication master processing, PLC 100 causes a communication frame to make a circuit of field devices 90 in a cyclic manner (for example, of several to several ten milliseconds) at intervals synchronized with control period 10. According to the present embodiment, EtherCAT is employed as an example of a protocol for transmission of such a communication frame in a cyclic manner.

Field devices 90 are connected together in sequence over network 110, for example, in a daisy chain. The communication frame has data field allocated to each field device 90. For example, upon receipt of the communication frame, each field device 90 writes a current value (process variable) to the data filed allocated to the field device in the communication frame thus received, or reads control data (manipulated variable, control variable) set by PLC 100 from the data field, and then sends out the communication frame to next field device 90.

Each field device 90 writes a current value of preset data to the communication frame, so that the communication frame that makes a circuit of network 110 and returns to the communication master (PLC 100) includes the latest value obtained as a result of observation in each field device 90.

The communication master processing by PLC 100 may be implemented by at least some of variable management program 160, scheduler program 170, input program 172, output program 174, and system program 151 running in cooperation with each other.

(d5. Software Configuration of Server 600)

Figure 6:
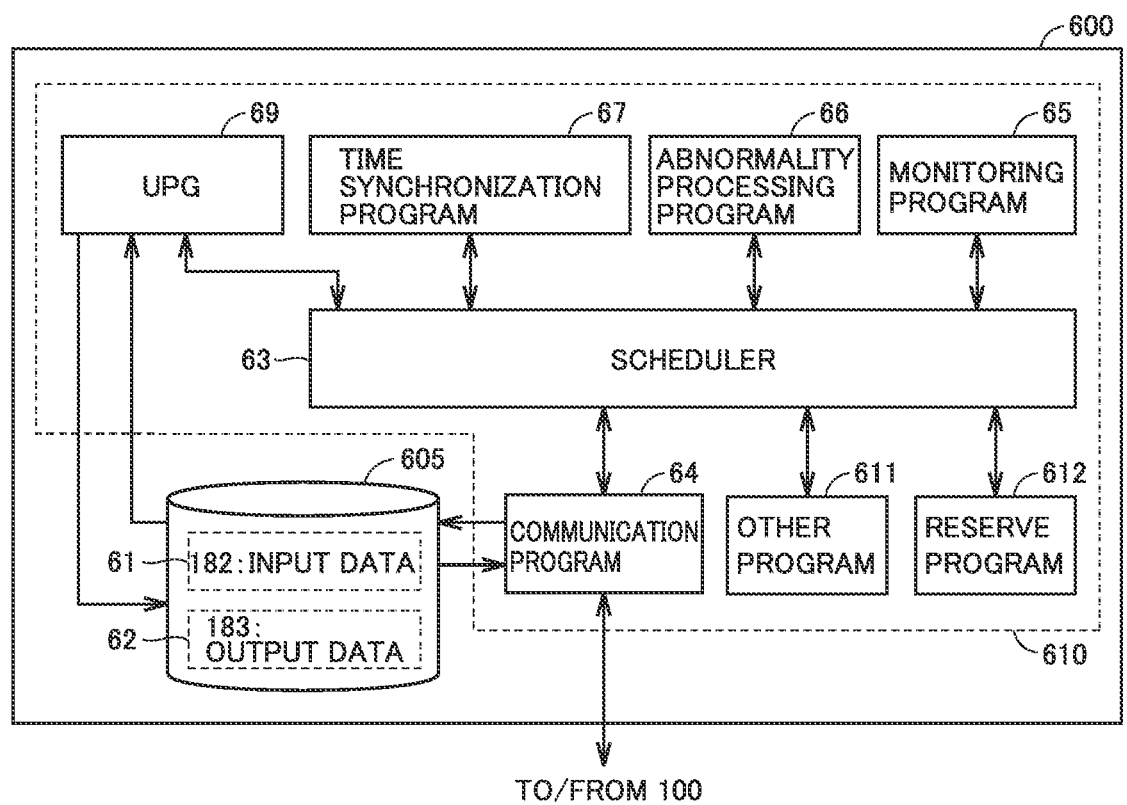
FIG. 6 is a diagram illustrating an example of a software configuration of server 600 according to the present embodiment.

FIG. 6 is a diagram illustrating an example of a software configuration of server 600 according to the present embodiment. Server 600 includes a processing engine 610. Processing engine 610 is implemented by server program 68 under the OS of system program 71.

Processing engine 610 executes time synchronization program 67 that enables the above-described time synchronization with PLC 100 and scheduler 63, and executes UPGs 69A, 69B, communication program 64, abnormality processing program 66, monitoring program 65, other program 611, and reserve program 612 while managing the execution timing under scheduler 63. Scheduler 63 may be implemented as part of system program 71.

Communication program 64 exchanges data with each PLC 100. Specifically, communication program 64 stores input data (transmission) 182 from PLC 100 in area 61, and stores, in area 62, output data (reception) 183 that is a calculated value obtained as a result of the control calculation processing of UPG 69. Communication program 64 may exchange data in cooperation with a communication control program provided in network controller 620.

Time synchronization program 67 enables the above-described time synchronization with each PLC 100 and manages the execution interval of the program in server 600 based on the time synchronization. This allows, according to the present embodiment, server 600 to perform the control calculation processing of UPGs 69A, 69B at intervals based on the time synchronized with each PLC 100. Scheduler 63 manages resource allocation, execution timing, and the like for a process, a task, or the like created in server 600. Such a process or task includes a process or task that may be created by abnormality processing program 66, monitoring program 65, time synchronization program 67, and the like running on server 600. Scheduler 63 adjusts the execution timing of each program based on, for example, a predetermined control period.

E. Basic System

Figure 7:
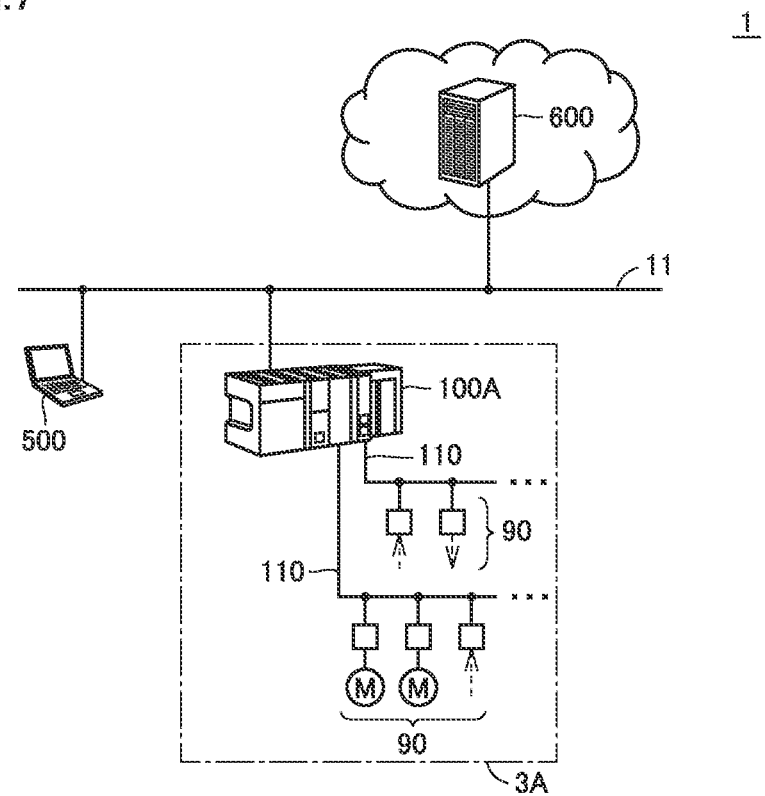
FIG. 7 is a diagram schematically illustrating a basic system of control system 1 according to the present embodiment.

First, a description will be given of data exchanges between PLC 100 and server 600 in a basic system of control system 1. FIG. 7 is a diagram schematically illustrating the basic system of control system 1 according to the present embodiment. Referring to FIG. 7, in the basic system, one PLC 100 (for example, PLC 100A) is connected to server 600.

(e1 Timing Chart of Basic System)

Figure 8:
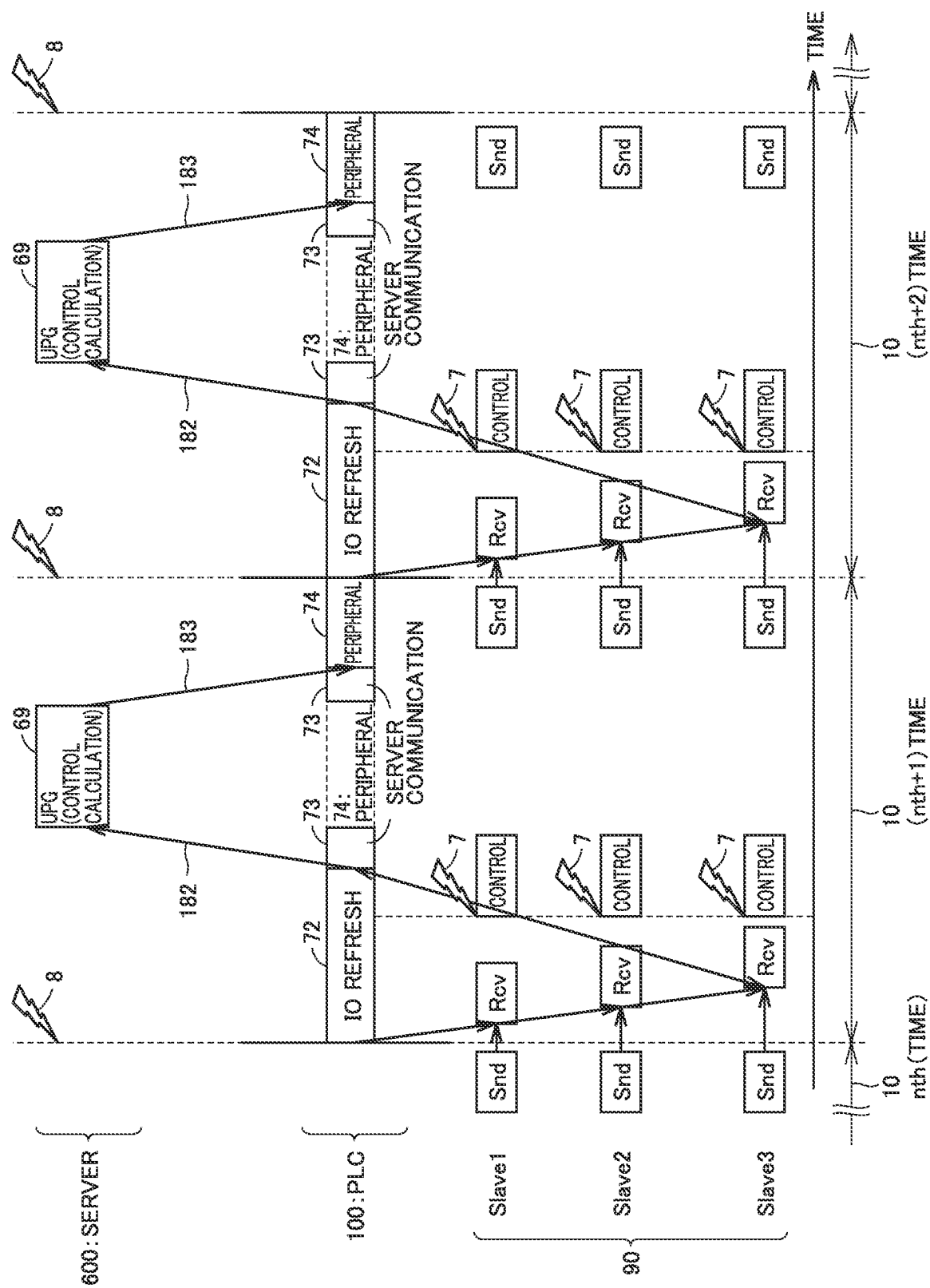
FIG. 8 is a diagram schematically illustrating an example of a timing chart of the basic system according to the present embodiment.

FIG. 8 is a diagram schematically illustrating an example of a timing chart of the basic system according to the present embodiment. Start and end timings of processing including communications between server 600 and PLC 100 and a length of runtime of processing are shown along the lapse of time represented on the horizontal axis of the timing chart. The length of runtime of processing is represented as a length of a bar extending in a time axis direction. In FIG. 8, three field devices 90 (slave 1, slave 2, and slave 3) are connected to PLC 100, but the number of field devices 90 to be connected is not limited to three.

Further, according to the present embodiment, in PLC 100, IO refresh 156, transfer program 158 for PLC 100 to communicate with server 600, and peripheral processing program 154 are scheduled by scheduler program 170 to be executed in this order. This causes, in PLC 100, IO refresh processing 72, server communication 73, and peripheral processing 74 to be performed in this order in each control period 10 based on the synchronized time, as illustrated in FIG. 8. Control period 10 is an example of a period of time shared by PLC 100 and server 600 that are time-synchronized with each other, and PLC 100 and server 600 detect the start and end timings of control period 10 in response to receipt of a common trigger 8.

In field device 90, in control period 10, processing "Snd" of transmitting input data 162 as the process variable to PLC 100, processing "Rcv" of receiving output data 163 including the manipulated variable and the control variable from PLC 100, and "control" on the control target in accordance with output data 163 are performed in this order. The "control" in field device 90 corresponds to processing that is started in response to receipt of a common trigger 7, and in this processing, the control target is controlled in accordance with output data 163 received immediately before. According to the present embodiment, trigger 7 is issued to each field device 90 when all field devices 90 have received output data 163. This allows field devices 90 to start the control processing at timings synchronized with each other. Note that trigger 7 and trigger 8 can be issued from a signal generation circuit (not illustrated) included in control system 1.

Referring to FIG. 8, after each field device 90 performs the processing "Snd", (n)th (where n=1, 2, 3, . . . ) control period 10 ends, and (n+1)th control period 10 starts.

When (n+1)th control period 10 starts, IO refresh processing 72 is performed, and PLC 100 manipulates data received from field device 90 in last (n)th control period 10. Specifically, in IO refresh processing 72, the variable value of input data 162 of device variable 161 is updated with the incoming data from field device 90. As a result, the variable value of input data 162 of device variable 161 is collected.

In subsequent server communication 73, input data 162 collected immediately before is converted into input data (transmission) 182 and transmitted to server 600 via gateway program 194. Further, at this time, field device 90 performs the processing "Rcv" of receiving output data 163 transmitted by output program 174 of PLC 100, and then starts the "control" in response to trigger 7. Upon the end of "control", field device 90 performs the processing "Snd".

In (n+1)th control period 10, processing is performed with PLC 100 and server 600 synchronized with each other. Server 600 receives input data (transmission) 182 from PLC 100, and executes UPG 69 at a timing based on a time synchronized with PLC 100. Server 600 transmits the calculated value obtained as a result of the control calculation processing by UPG 69 (that is, corresponding to output data (reception) 183) to PLC 100. PLC 100 receives the calculated value from server 600 and stores the calculated value as output data (reception) 183 in buffer 180. Then, PLC 100 performs peripheral processing 74. Subsequently, in (n+2)th control period 10, the processing is performed in the same manner as in (n+1)th control period 10.

Further, in control period 10, PLC 100 may perform peripheral processing 74 in a period between the transmission of input data (transmission) 182 to server 600 and the reception of output data (reception) 183 from server 600.

In the basic system, server 600 and PLC 100 are time-synchronized with each other, so that IO refresh processing 72 and UPG 69 (control calculation processing) are performed (started) by PLC 100 and server 600, respectively, within control period 10.

(e2. Flowchart of Basic System)

Figure 9:
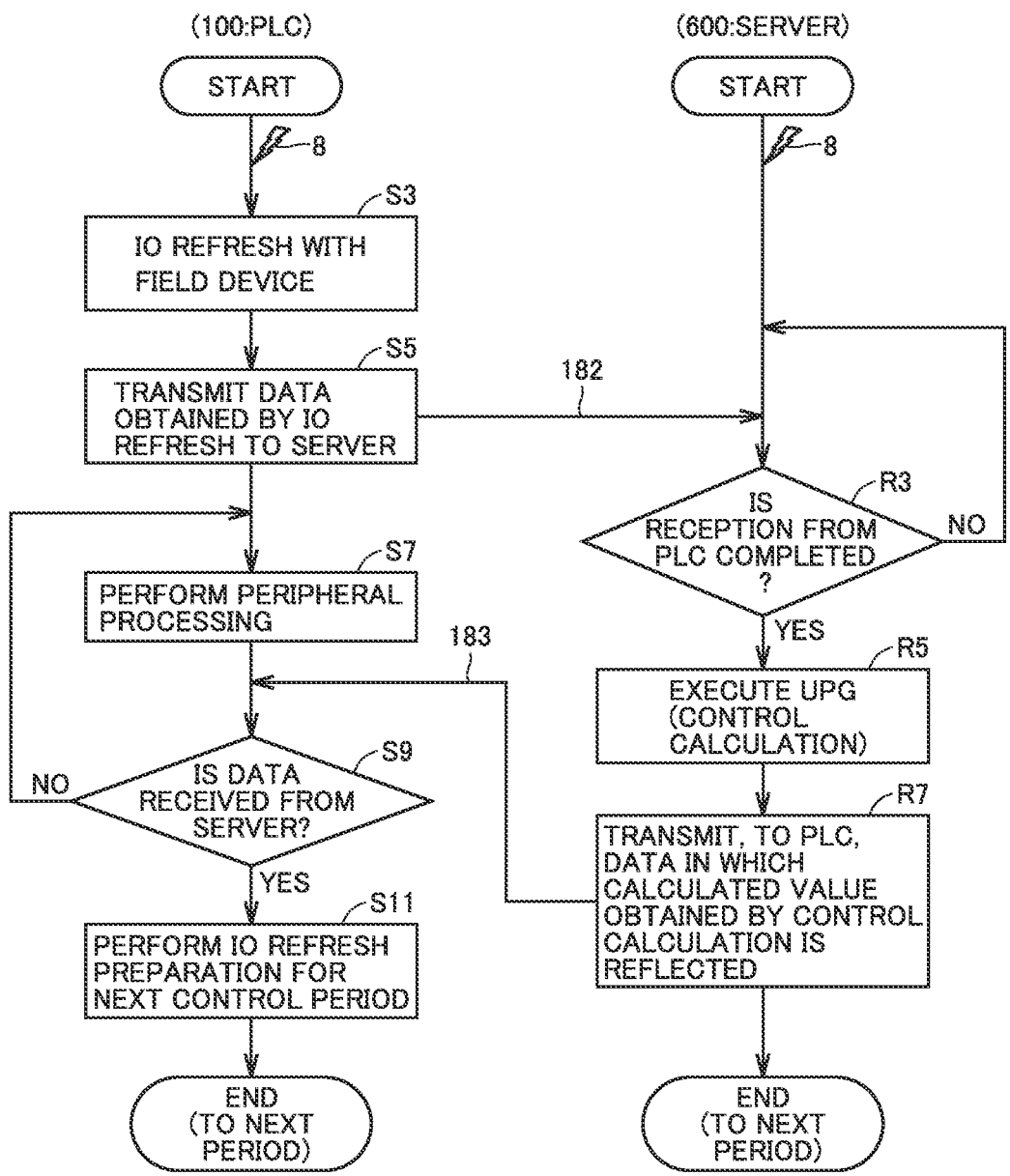
FIG. 9 is a diagram illustrating an example of a flowchart of processing in the basic system according to the present embodiment.

FIG. 9 is a diagram illustrating an example of a flowchart of processing in the basic system according to the present embodiment. In FIG. 9, the processing performed by PLC 100 and the processing performed by server 600 in control period 10 are illustrated in association with each other. In FIG. 9, trigger 8 is issued to PLC 100 and server 600 to indicate the start of control period 10. Therefore, upon receipt of common trigger 8, PLC 100 and server 600 start processing to be performed in control period 10.

First, PLC 100 performs IO refresh processing 72 in response to trigger 8 (step S3). PLC 100 performs server communication 73 to transmit input data (transmission) 182 collected by IO refresh processing 72 to server 600 (step S5).

Subsequently, PLC 100 performs peripheral processing 74 (step S7). PLC 100 determines whether output data (reception) 183 has been received from server 600 via server communication 73 (whether the reception is completed) (step S9). When it is determined that there is no reception or the reception is not completed (NO in step S9), the processing returns to step S7, and peripheral processing 74 is performed.

On the other hand, when PLC 100 determines that the reception of output data (reception) 183 is completed (YES in step S9), preparation for next control period 10 is performed (step S11). Specifically, in order to control field device 90, output data (reception) 183 thus received is set (copied) to the output variable of device variable 161. This allows, in next control period 10, the calculated value (manipulated variable, control variable) obtained as a result of the control calculation by server 600 to be output to field device 90. Then, the processing proceeds to next control period 10.

Further, upon receipt of trigger 8, server 600 performs processing of receiving input data (transmission) 182 from PLC 100 by using communication program 64. Server 600 determines whether the reception of input data (transmission) 182 is completed (step R3). The determination as to whether the reception is completed is made based on, for example, the fact that a predetermined time has elapsed since the reception of trigger 8. When it is determined that the reception of input data (transmission) 182 is not completed (NO in step R3), step R3 is repeatedly performed.

On the other hand, when server 600 determines that the predetermined time has elapsed, that is, the reception of input data (transmission) 182 is completed (YES in step R3), server 600 executes UPG 69 (step R5). As a result, the control calculation processing using input data (transmission) 182 thus received is performed. Server 600 reflects (sets) the calculated value obtained as a result of the control calculation in output data (reception) 183, and transmits output data (reception) 183 to PLC 100 by using communication program 64 (step R7). Then, the processing proceeds to next control period 10.

In FIG. 9, PLC 100 and server 600 time-synchronized with each other start their respective pieces of processing in response to trigger 8 issued at the start of control period 10, so that the respective pieces of processing can be started within a period of time (time within control period 10) shared based on the time synchronization.

(e3. Modification of Flowchart of Basic System)

Figure 10:
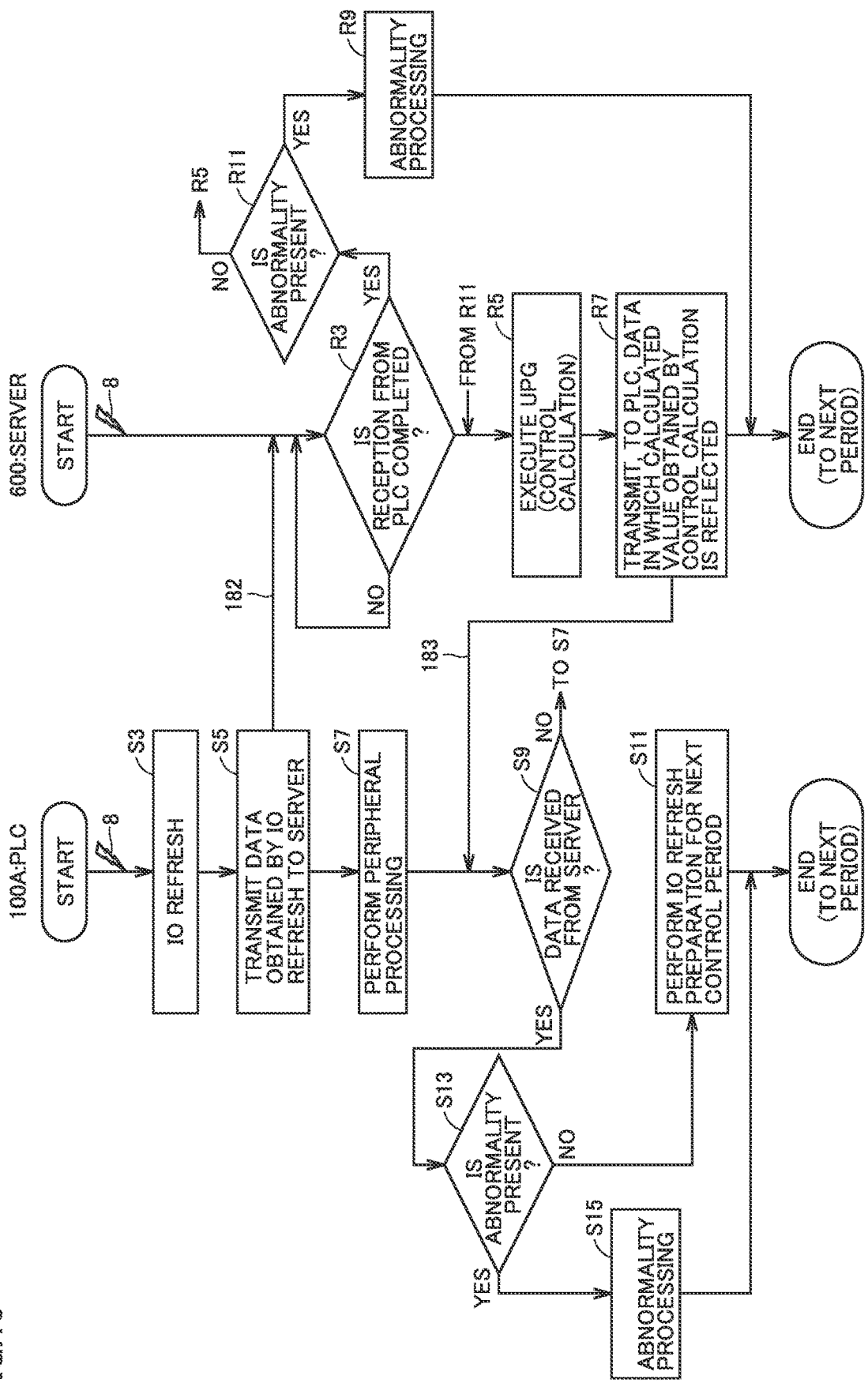
FIG. 10 is a diagram illustrating a modification of the flowchart of processing in the basic system according to the present embodiment.

The processing in the basic system in FIG. 9 can also be modified to include processing of handling an abnormality as illustrated in FIG. 10. FIG. 10 is a diagram illustrating a modification of the flowchart of processing in the basic system according to the present embodiment. The processing in FIG. 10 corresponds to processing obtained as a result of adding abnormality processing (steps S13, S15, R9, R11) to the processing in FIG. 9. The other processing in FIG. 10 is the same as in FIG. 9, and no redundant description will be given of the other processing.

Referring to FIG. 10, when determining that the reception of output data (reception) 183 from server 600 is completed (YES in step S9), PLC 100 causes monitoring program 179 to determine whether an abnormality occurs (step S13). Monitoring program 179 determines whether an abnormality occurs based on whether the reception in step S9 is completed within a certain period of time from the receipt of trigger 8. When monitoring program 179 determines that the reception is completed within the certain period of time (NO in step S13 indicates that no abnormality occurs), the processing proceeds to step S11. Further, when monitoring program 179 determines that the reception is not completed within the certain period of time (YES in step S13 indicates that an abnormality occurs), PLC 100 causes abnormality processing program 178 to perform the abnormality processing (step S15). Then, the processing in this control period 10 is brought to an end.

Note that monitoring program 179 may further include a determination as to whether an abnormality notification transmitted from server 600 has been received. Further, the abnormality processing (step S15) may include, for example, processing of storing log data on abnormality detection in secondary storage device 108 or processing of outputting the abnormality notification to support device 500 by using abnormality processing program 178. Further, after the abnormality processing (step S15), step S11 may be performed in the same manner as described above.

When an abnormality is detected (YES in step S13), processing of setting output data (reception) 183 from server 600 to output data 163 (step S11) is skipped. In this case, in next control period 10, field device 90 is controlled again in accordance with output data 163 received in last control period 10.

Further, when determining that the reception of input data (transmission) 182 from PLC 100 is completed (YES in step R3), server 600 causes monitoring program 65 to determine whether an abnormality occurs (step R11). Monitoring program 65 determines whether an abnormality occurs based on whether the reception is completed within a certain period of time from the receipt of trigger 8 in step R3. When monitoring program 65 determines that the reception is completed within the certain period of time (NO in step R11 indicates that no abnormality occurs), the processing proceeds to step R5. Further, when monitoring program 65 determines that the reception is not completed within the certain period of time (YES in step R11 indicates that an abnormality occurs), server 600 causes abnormality processing program 66 to perform the abnormality processing (step R9). Then, the processing in this control period 10 is brought to an end.

The abnormality processing in step R9 includes processing of transmitting an abnormality detection notification to PLC 100. Further, in FIG. 10, the end of the abnormality processing (step R9) brings the processing within this control period to an end, but the control calculation processing by UPG 69 may be performed in step R7. In this case, the control calculation processing based on input data (transmission) 182 received in last control period 10 is performed, and output data (reception) 183 that is the calculated value obtained as a result of the control calculation processing is transmitted to PLC 100 (step R7).

(e4. Another Modification of Flowchart of Basic System)

In the processing in FIG. 9 or the processing in FIG. 10, input data (transmission) 182 or output data (reception) 183 may be transmitted a plurality of times in order to ensure that the destination receives the data.

Specifically, in the processing (step S5) of PLC 100, the same frame storing input data (transmission) 182 is transmitted a plurality of times. The same identifier (ID) is assigned to the frame storing same input data (transmission) 182. Server 600 can detect that same input data (transmission) 182 is transmitted from PLC 100 based on the ID of the received frame.

Further, in the processing (step R7) of server 600, the same frame storing output data (reception) 183 is transmitted a plurality of times. The same identifier (ID) is assigned to the frame storing same output data (reception) 183. PLC 100 can detect that same output data (reception) 183 is transmitted from server 600 based on the ID of the received frame. Note that, in step R7, for example, server 600 can determine how many times the frame storing same output data (reception) 183 is transmitted based on a length of a period of time between the transmission start timing of output data (reception) 183 and the start timing of next control period 10.

As described above, since input data (transmission) 182 and output data (reception) 183 are transmitted a plurality of times, even when data drops off (data is lost) on network 11, the data can be restored on the reception side. Further, even when the order of data arriving at the reception side is disturbed due to jitter on network 11, the reception side can receive the data in the original order based on the ID of the data.

F. Multiplex System

Figure 11:
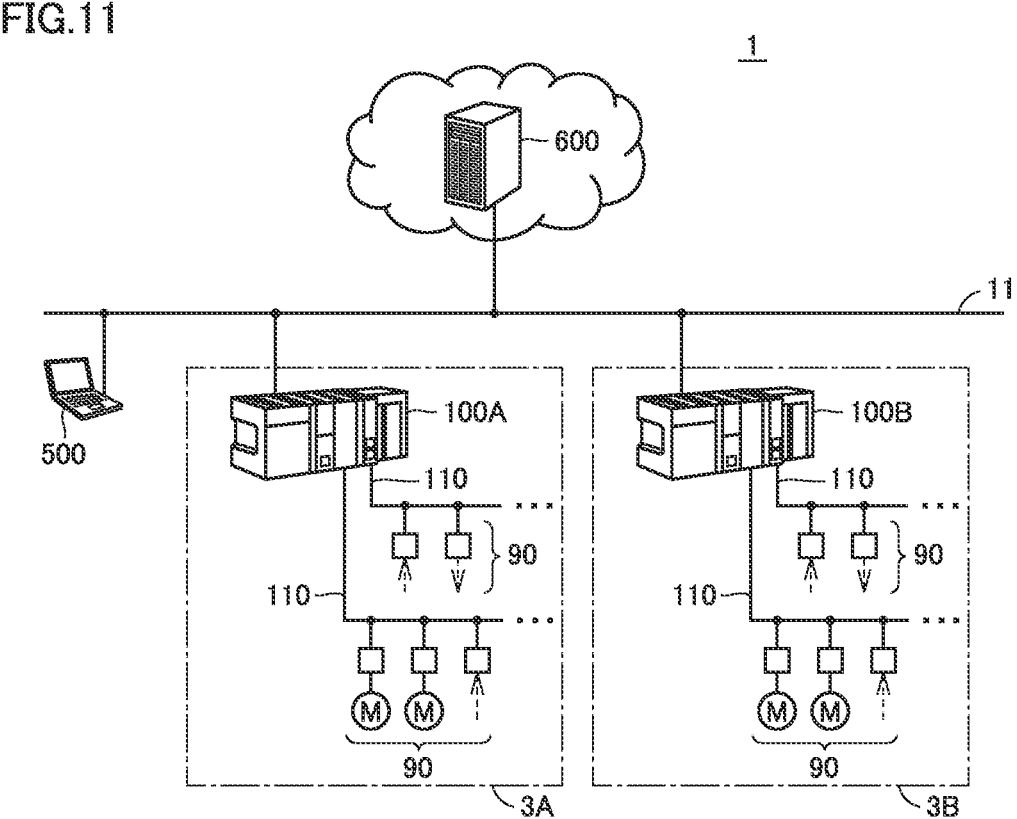
FIG. 11 is a diagram schematically illustrating a multiplex system of control system 1 according to the present embodiment.

Control system 1 may be a multiplex system. The multiplex system includes server 600 and plurality of PLCs 100 connected to server 600 over network 11. FIG. 11 is a diagram schematically illustrating the multiplex system of control system 1 according to the present embodiment. Referring to FIG. 11, in the multiplex system, two PLCs 100 (for example, PLC 100A and PLC 100B) are connected to server 600. Note that the number of PLCs 100 connected to server 600 is not limited to two, and may be three or more.

(f1. Timing Chart of Multiplex System)

Figure 12:
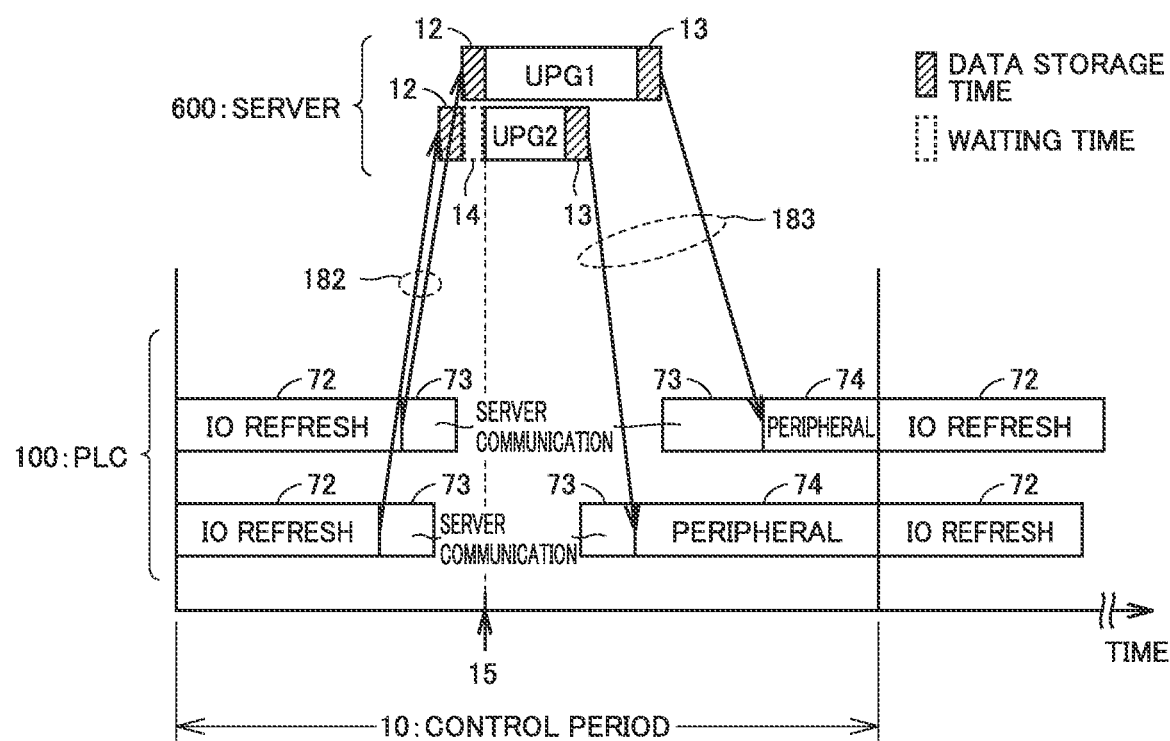
FIG. 12 is a diagram schematically illustrating an example of a timing chart of the multiplex system according to the present embodiment.

FIG. 12 is a diagram schematically illustrating an example of a timing chart of the multiplex system according to the present embodiment. Note that, in FIG. 12, the processing of field device 90 is not shown. In FIG. 12, "UPG 1" for the control calculation processing based on input data (transmission) 182 from PLC 100A and "UPG 2" for the control calculation processing based on input data (transmission) 182 from PLC 100B are executed. "UPG 1" and "UPG 2" can be simultaneously started in response to common trigger 8.

Referring to FIG. 12, although PLCs 100A, 100B start IO refresh processing 72 in synchronization with the start of control period 10, due to a difference in the number of field devices 90 connected to each PLC 100, the number of input variables to be collected, the load on network 110, or the like, there may be a difference in time at which server communication 73 can be started (that is, the time when the collection of input data (transmission) 182 is completed by IO refresh processing 72). As described above, in server 600, a data storage time 12 at which input data (transmission) 182 is received from PLC 100A and stored in area 61 does not coincide with a data storage time 12 at which input data (transmission) 182 is received from PLC 100B and stored in area 61 due to a difference in time when server communication 73 can be started. In server 600, this "deviation" is adjusted by a waiting time 14. For example, server 600 starts to execute "UPG 1" and "UPG 2" at the same time (in parallel) at a time 15 when waiting time 14 after the completion of the data storage of input data (transmission) 182 of PLC 100B has elapsed.

For the parallel execution of "UPG1" and "UPG2", "UPG2" may be executed using a calculated value of "UPG1". As a result, for example, a calculated value based on position data (output data) from a servo device (field device 90) connected to PLC 100A is used for the control calculation of "UPG 2" (for example, for determination of a manipulated variable for a servo device (field device 90) connected to PLC 100B).

The calculated values (output data (reception) 183) obtained as results of the control calculation of "UPG 1" and "UPG 2" executed in parallel are stored in area 62 at a data storage time 13. Output data (reception) 183 in area 62 is transmitted to each of PLCs 100A, 100B. PLCs 100A, 100b each completes the reception of output data (reception) 183 from server 600 before the start of next control period 10.

Figure 13:
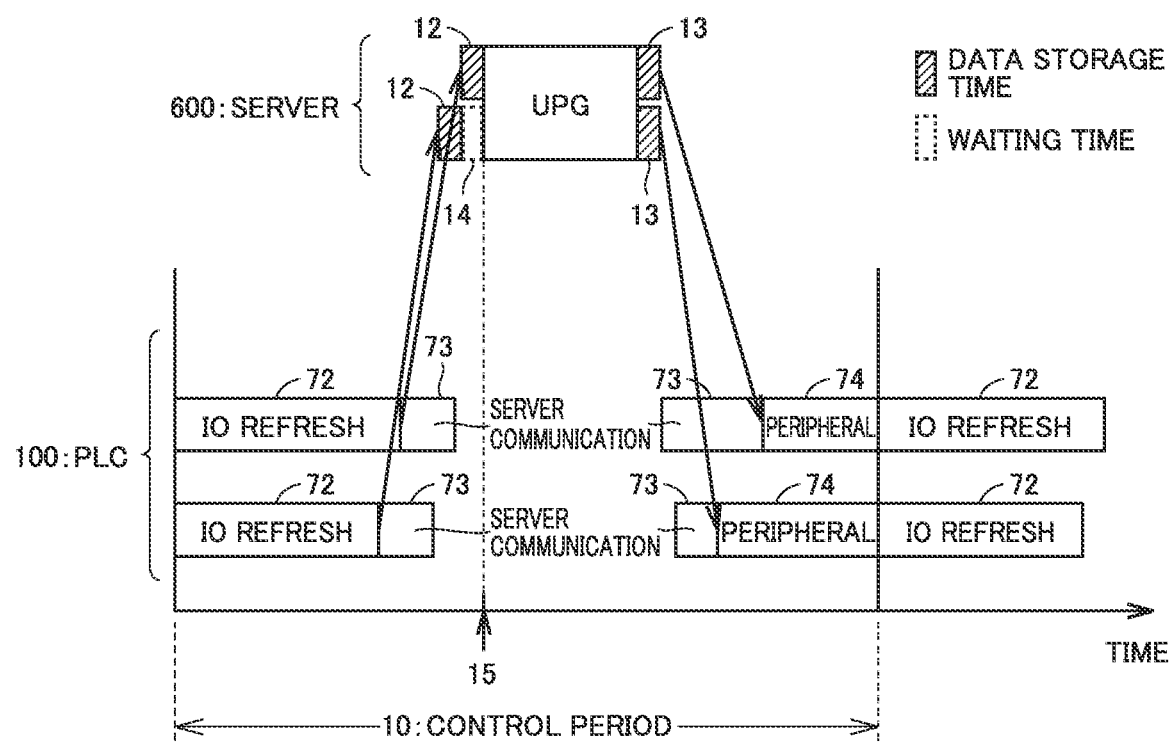
FIG. 13 is a diagram schematically illustrating another example of the timing chart of the multiplex system according to the present embodiment.

FIG. 13 is a diagram schematically illustrating another example of the timing chart of the multiplex system according to the present embodiment. In FIG. 12, for example, an environment where the control calculation by "UPG 1" of PLC 100A and the control calculation by "UPG 2" of PLC 100B are executed in parallel by using different UPGs 69 running on server 600 is provided. On the other hand, as illustrated in FIG. 13, server 600 may execute one type of UPG 69. This allows the control calculation based on input data (transmission) 182 from each PLC 100 to be shared between PLCs 100.

Note that, in both FIGS. 12 and 13, PLC 100 may perform peripheral processing 74 in a period of time between the transmission of input data (transmission) 182 to server 600 and the reception of output data (reception) 183 from server 600.

(f2. Flowchart of Multiplex System)

Figure 14:
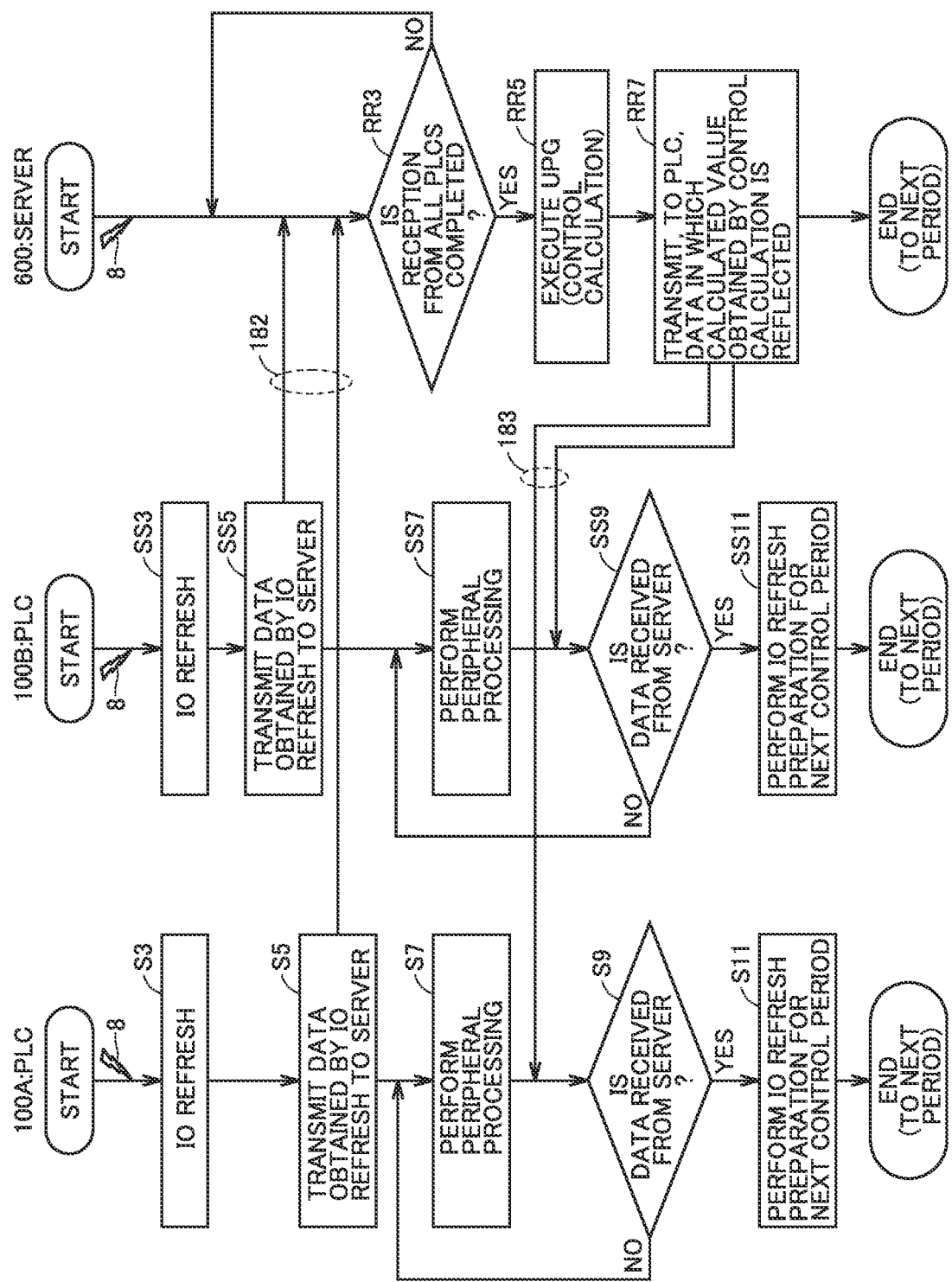
FIG. 14 is a diagram illustrating an example of a flowchart of processing in the multiplex system according to the present embodiment.

FIG. 14 is a diagram illustrating an example of a flowchart of processing in the multiplex system according to the present embodiment. In FIG. 14, processing performed by PLC 100A, processing performed PLC 100B, and processing performed server 600 are illustrated in association with each other, each processing being performed in accordance with the timing chart of FIG. 12 or 13. In PLC 100A, steps S3, S5, S7, S9, and S11 are performed in the same manner as in FIG. 9. Further, in PLC 100B, steps SS3, SSS, SS7, SS9, and SS11 are performed in the same manner as steps S3 to S11 described above. Further, in server 600, steps RR3, RR5, and RR7 are performed. In the multiplex system, in step RR3, input data (transmission) 182 is received from each of PLCs 100A, 100B. Further, in step RR7, output data (reception) 183 is transmitted to each of PLCs 100A, 100B. Note that, in the processing in FIG. 14, the monitoring processing and the abnormality processing illustrated in FIG. 10 may be performed. Such processing is the same as in FIG. 9 or 10, and thus no redundant description will be given of the processing.

(f3. Application Example of Multiplex System)

Figure 15:
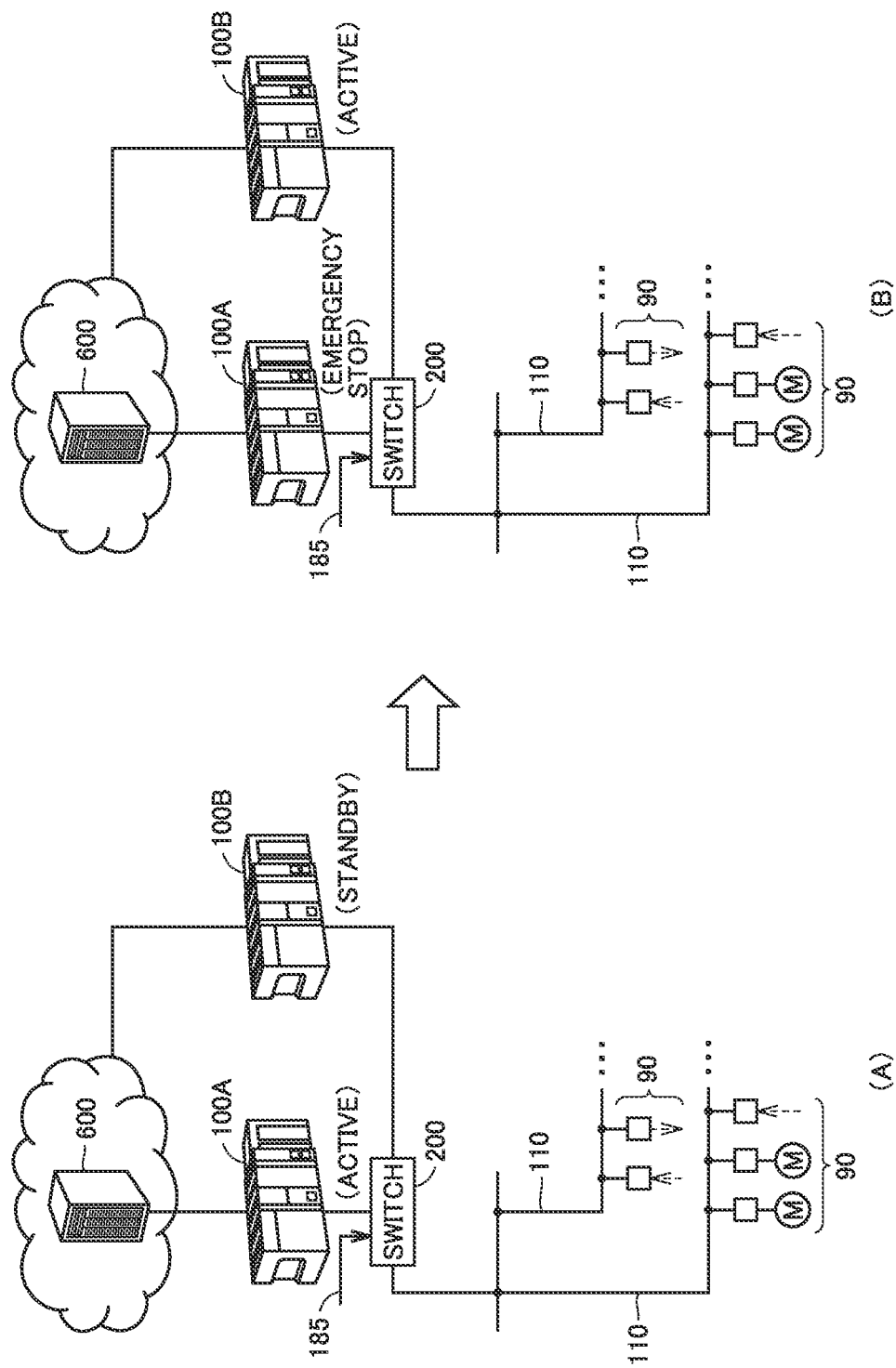
FIG. 15 is a diagram schematically illustrating an application example of the multiplex system according to the present embodiment.

The above-described multiplex system is applicable to handling when an event occurs in control system 1. The present invention is applicable to, for example, but not limited to, a measure to be taken when a failure occurs. FIG. 15 is a diagram schematically illustrating an application example of the multiplex system according to the present embodiment. In control system 1 in FIG. 15, one of plurality of PLCs 100 connected to server 600 is put into operation as an active system, and other PLC 100 is put into operation as a standby system for backup. PLC 100 serving as the standby system is configured to take over control by PLC 100 serving as the active system when a failure occurs in PLC 100 serving as the active system. For example, PLC 100A serves as the active system, and PLC 100B serves as the standby system. PLC 100A and PLC 100B are connected to network 110 of field devices 90 via a switch 200. When a failure occurs, switch 200 connects either PLC 100A or PLC 100B to network 110 in accordance with an instruction signal 185.

(A) of FIG. 15 illustrates a case where control system 1 is in normal operation, and (B) of FIG. 15 illustrates a case where a failure occurs. Instruction signal 185 indicates either "normal operation" or "failure occurs", and switch 200 is configured to connect PLC 100A to network 110 when instruction signal 185 indicates "normal operation" and to connect PLC 100B to network 110 when instruction signal 185 indicates "failure occurs".

During normal operation illustrated in (A) of FIG. 15, PLC 100B serving as the standby system is in a standby state where PLC 100B is not in operation. When detecting emergency stop of PLC 100A in operation, server 600 outputs instruction signal 185 indicating "failure occurs" to switch 200 and outputs an active instruction to PLC 100B. This causes switch 200 to switch PLC 100 connected to field device 90 from PLC 100A to PLC 100B.

When a failure occurs, as illustrated in (B) of FIG. 15, PLC 100A stops, but PLC 100B serving as the standby system is switched from a standby mode to an active mode in accordance with the active instruction. When PLC 100B is put into operation, server 600 switches PLC 100 that exchanges input data (transmission) 182 and output data (reception) 183 from PLC 100A to PLC 100B. As a result, even when a failure occurs, the control on field device 90 can be continued.

Note that the timing at which PLC 100B serving as the standby system is time-synchronized with server 600 and field device 90 may be, but not limited to, a time at which PLC 100B is put into operation. For example, PLC 100B during standby may be time-synchronized with server 600 and field device 90.

In FIG. 15, server 600 already has the runtime environment of UPG 69, which eliminates, even when PLC 100B serving as the standby system is put into operation, the need for PLC 100B to prepare the runtime environment of UPG 69 (install (copy) UPG 69 or the like). It is therefore possible to bring PLC 100B serving as the standby system into operation quickly.

(f4. Another Application Example of Multiplex System)

Figure 16:
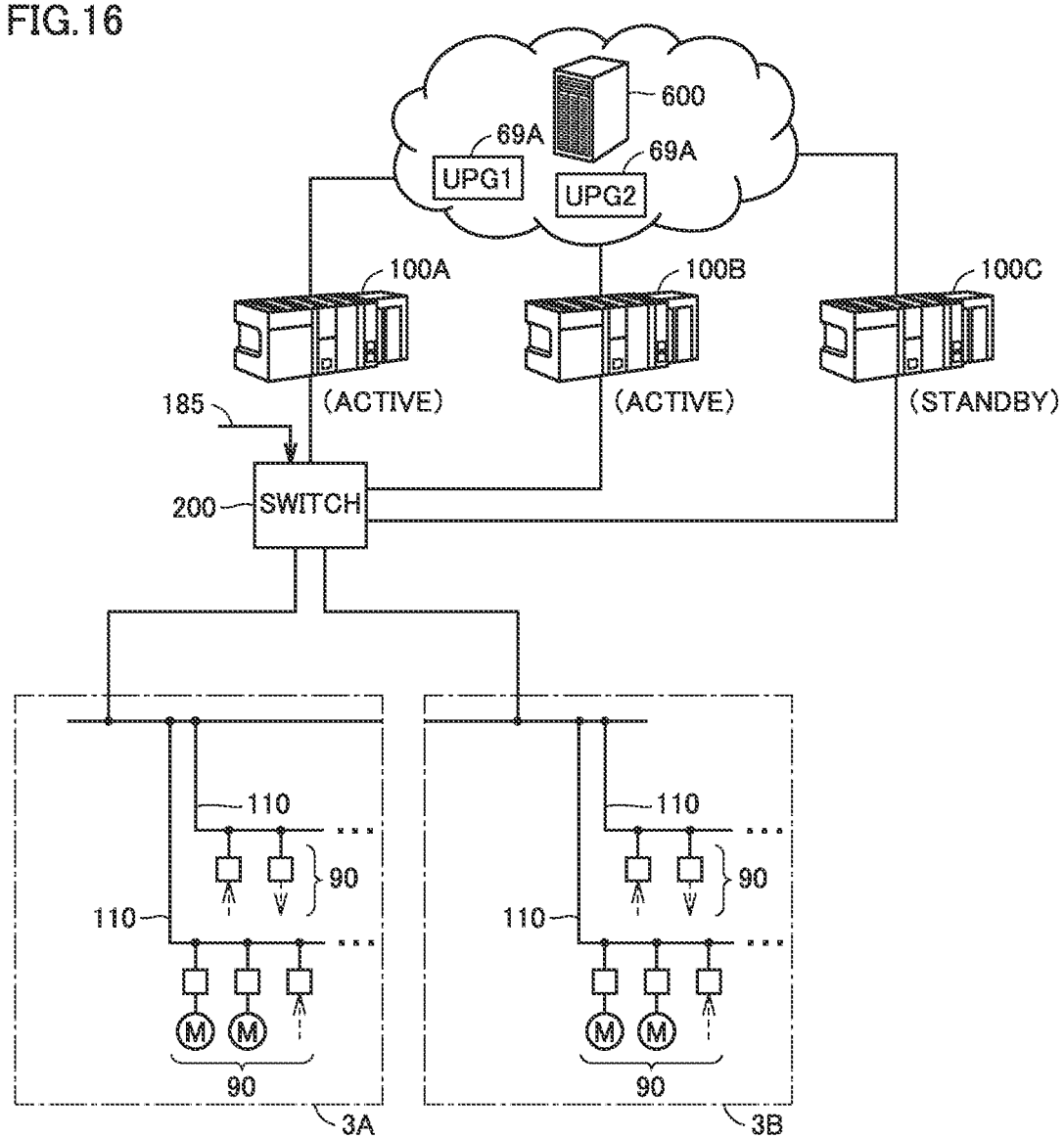
FIG. 16 is a diagram schematically illustrating another application example of the multiplex system according to the present embodiment.

FIG. 16 is a diagram schematically illustrating another application example of the multiplex system according to the present embodiment. A description will be given of another case where the above-described multiplex system is applied to a measure against a failure in control system 1 with reference to FIG. 16. In the configuration in FIG. 15, PLC 100A is set as the active system, and PLC 100B is set as the standby system dedicated to PLC 100A, but PLC 100 serving as the standby system can be shared among plurality of PLCs 100 serving as the active system as illustrated in FIG. 16.

In FIG. 16, PLC 100A, PLC 100B, and PLC 100C are connected to server 600. Among these three PLCs 100, PLCs 100A and 100B serve as the active system, and PLC 100C serves as the standby system shared between PLCs 100A and 100B. As described above, in FIG. 16, one PLC 100 serving as the standby system can be shared among plurality of PLCs 100 serving as the active system. In FIG. 16, server 600 executes "UPG 1" for the control calculation processing for PLC 100A and "UPG 2" for the control calculation processing for PLC 100B.

For example, when a failure occurs in PLC 100A, PLC 100C serving as the standby system is put into operation, and switch 200 switches PLC 100 connected to network 110 in a process 3A from PLC 100A to PLC 100C in accordance with instruction signal 185. Further, server 600 switches PLC 100 that exchanges input data (transmission) 182 and output data (reception) 183 for the control calculation of "UPG 1" from PLC 100A to PLC 100C. As a result, even when a failure occurs in PLC 100A, PLC 100C can continue the control on field device 90 in process 3A.

Likewise, when a failure occurs in PLC 100B, PLC 100C serving as the standby system is put into operation, and switch 200 switches PLC 100 connected to network 110 in a process 3B from PLC 100B to PLC 100C in accordance with instruction signal 185. Further, server 600 switches PLC 100 that exchanges input data (transmission) 182 and output data (reception) 183 for the control calculation of "UPG 2" from PLC 100B to PLC 100C. As a result, even when a failure occurs in PLC 100B, PLC 100C can continue the control on field device 90 in process 3B.

Note that, in FIGS. 15 and 16, when a failure occurs in PLC 100 serving as the active system, PLC 100 serving as the standby system is put into operation, but a predetermined timing at which PLC 100 serving as the standby system is put into operation is not limited to the time when the failure occurs.

G. Oversampling

Figure 17:
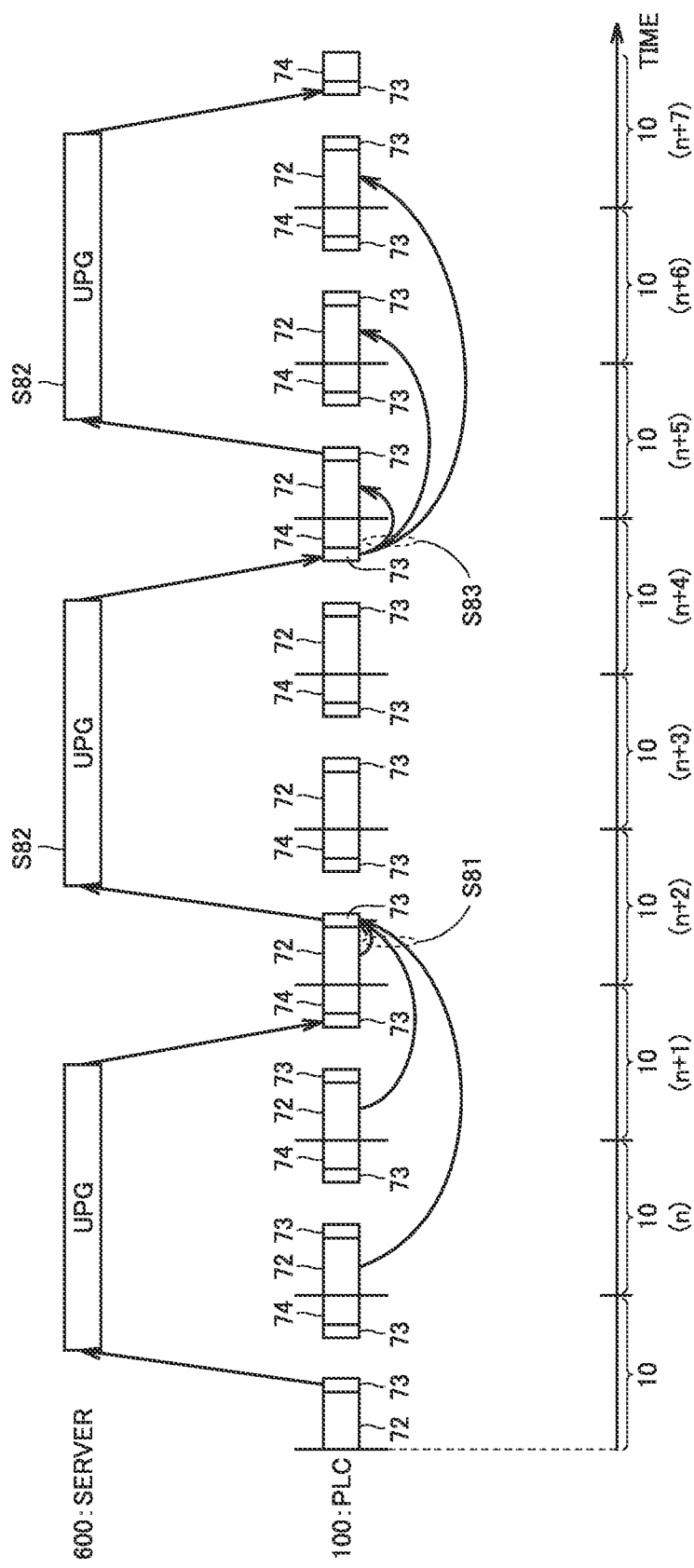
FIG. 17 is a diagram schematically illustrating an example of oversampling according to the present embodiment.
Figure 18:
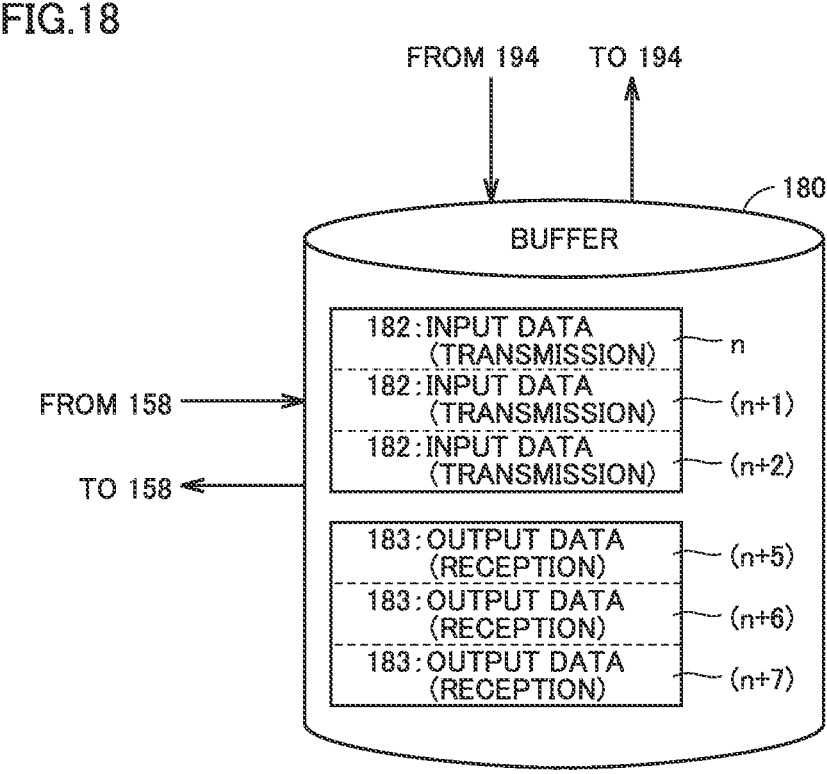
FIG. 18 is a diagram schematically illustrating an example of data stored as a result of the oversampling illustrated in FIG. 17.

FIG. 17 is a diagram schematically illustrating an example of oversampling according to the present embodiment. FIG. 18 is a diagram schematically illustrating an example of data stored as a result of the oversampling illustrated in FIG. 17. According to the above-described embodiment, server communication 73 for exchanging input data (transmission) 182 and output data (reception) 183 between PLC 100 and server 600 is performed every control period 10. This causes server 600 to receive input data (transmission) 182 and transmit output data (reception) 183 every control period 10.

According to the present embodiment, input data (transmission) 182 and output data (reception) 183 exchanged via server communication 73 are not limited to data for one control period 10, and may be data for N (where N>1) control periods 10 as illustrated in FIG. 17. In this case, after input data (transmission) 182 for N control periods 10 is collected by IO refresh processing 72, the data thus collected is transmitted to server 600. Hereinafter, collection, by PLC 100 in a period longer than control period 10, of data to be transmitted to server 600 via a single communication may be referred to as "oversampling".

(g1. Example of Oversampling)

A description will be given of "oversampling" when N is equal to, for example, but not limited to, three with reference to FIG. 17. FIG. 18 schematically illustrates, in buffer 180, an area for storing collected input data (transmission) 182 for three control periods 10, and an area for storing output data (reception) 183 for three control periods 10 received from server 600.

PLC 100 stores, in buffer 180, input data (transmission) 182 for three control periods 10 collected by IO refresh processing 72 in nth, (n+1)th, and (n+2)th control periods 10. PLC 100 transmits input data (transmission) 182 for three control periods 10 in buffer 180 to server 600 via server communication 73 in (n+2)th control period 10 (step S81). Input data (transmission) 182 for three control periods 10 collected by IO refresh processing 72 in (n+3)th, (n+4)th, and (n+5)th control periods 10 is stored in buffer 180, and PLC 100 transmits input data (transmission) 182 for three control periods 10 in buffer 180 to server 600 via server communication 73 in (n+5)th control period 10 (step S81). As described above, PLC 100 transmits input data (transmission) 182 collected in three control periods 10 to server 600 every three control periods 10.

On the other hand, server 600 receives input data (transmission) 182 for three control periods 10 from PLC 100 every three control periods 10, and performs the control calculation based on input data (transmission) 182 received in each of control periods 10 (step S82). As a result, server 600 performs the control calculation for each of (n+2)th, (n+3)th, and (n+4)th control periods 10 to calculate output data (reception) 183 for three control periods 10 and transmit the output data to PLC 100.

In (n+4)th control period 10, PLC 100 receives, from server 600, output data (reception) 183 based on input data (transmission) 182 for three control periods 10, that is, nth, (n+1)th, and (n+2)th control periods 10. The received output data (reception) 183 is stored in buffer 180. PLC 100 performs IO refresh processing 72 so as to cause output data (reception) 183 for three control periods 10 in buffer 180 to be output to field device 90 in each of (n+5)th, (n+6)th, and (n+7)th control periods 10 (step S83).

Accordingly, as illustrated in FIG. 17, when PLC 100 collects, in nth (for example, (n+2)th) control period 10, input data (transmission) 182 for last N control periods 10 (that is, three, nth, (n+1)th, and (n+2)th, control periods 10) and transmits the collected input data to server 600, PLC 100 can acquire output data (reception) 183 for subsequent N control periods 10 (that is, three, (n+5)th, (n+6)th, and (n+7)th, control periods 10) from server 600.

The oversampling in FIG. 17 brings about an advantage for, for example, but not limited to, a case where the communication time of network 110 between PLC 100 and field device 90 is long or a case where the communication time of network 11 between PLC 100 and server 600 is long. That is, when the communication time is long, waiting time 14 becomes long, which frequently causes a situation (abnormality) in which the control calculation of UPG 69 fails to complete within control period 10. On the other hand, when the oversampling is enabled, it is not necessary to perform server communication 73 in each control period 10, which eliminates the need for waiting time 14 in each control period 10.

For example, server 600 (or PLC 100) measures the communication time (or a communication rate) of network 11, PLC 100 measures a communication time of network 110, and when the measured communication time exceeds a threshold, server 600 and PLC 100 is brought into a mode of enabling oversampling.

(g2. Another example of oversampling)

Figure 19:
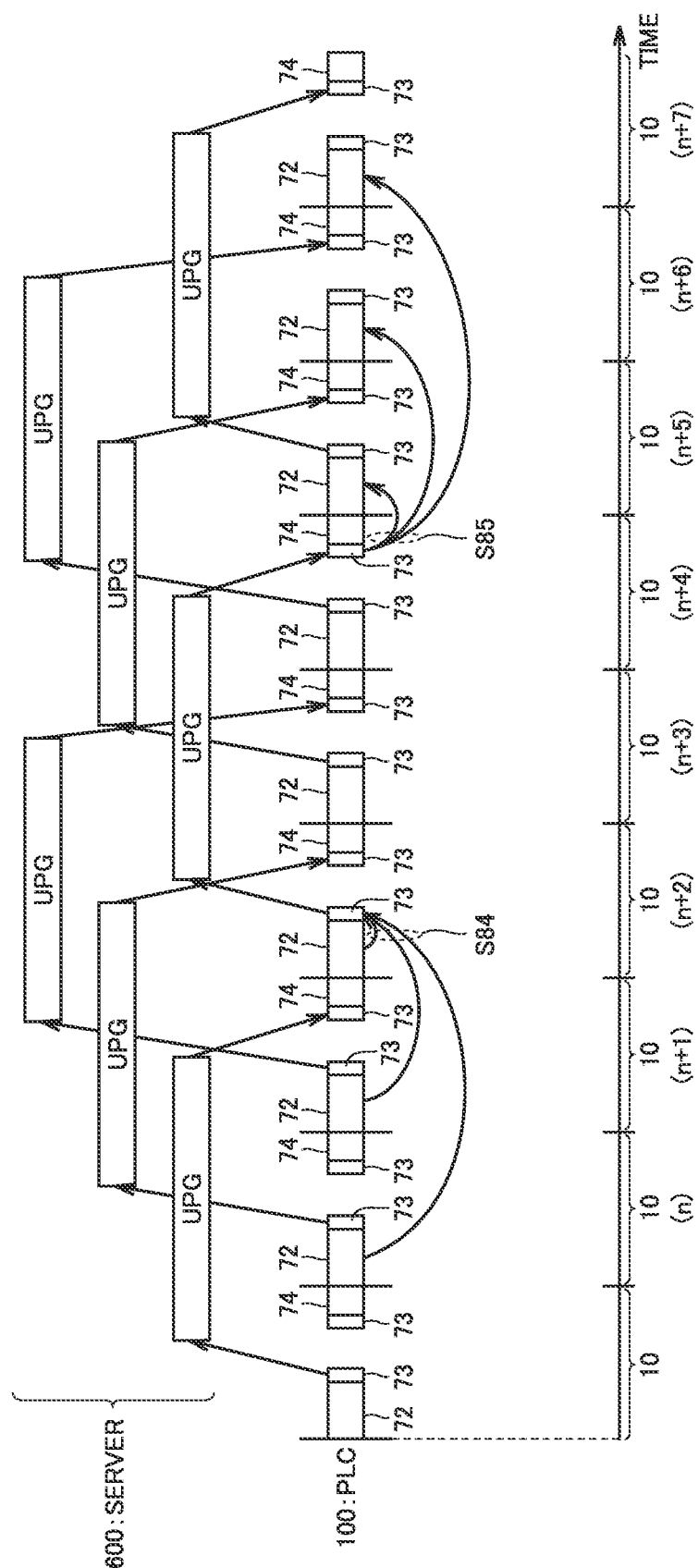
FIG. 19 is a diagram schematically illustrating another example of the oversampling according to the present embodiment.

FIG. 19 is a diagram schematically illustrating another example of the oversampling according to the present embodiment. In FIG. 19, PLC 100 transmits input data (transmission) 182 collected for last N control periods 10 to server 600 via server communication 73 in each control period 10 (steps S84 and S85). This causes server 600 to receive, in each control period 10, input data (transmission) 182 for last N control periods 10. Server 600 performs, in each control period 10, the control calculation based on input data (transmission) 182 for N control periods 10 received from PLC 100 to calculate output data (reception) 183 for future N control periods 10, and transmits the output data to PLC 100. For example, server 600 executes UPGs 69 using input data (transmission) 182 received in each control period 10 in parallel with multiprocessing to create, every control period 10, output data (reception) 183 for future N control periods 10.

The oversampling in FIG. 19 causes PLC 100 to repeatedly transmit input data (transmission) 182 for same control period 10 to server 600, and server 600 also repeatedly transmits output data (reception) 183 for same control period 10 to PLC 100. Therefore, for example, even when an error (for example, data lost during communication, or the like) occurs in data communication over network 11 or network 110 in certain control period 10, repetitive transmission of the same data (input data (transmission) 182 or output data (reception) 183) makes it possible to handle the error (recovery from the error, e.g. data complement).

H. Prediction of Output Data for Control Period

Unlike the above-described oversampling, output data (reception) 183 for plurality of future control periods 10 may be predicted (calculated) based on input data (transmission) 182 for one control period 10.

In this case, PLC 100 transmits input data (transmission) 182 collected in one control period 10 to server 600 via server communication 73, and server 600 calculates (predicts) output data (reception) 183 for future N control periods 10 by performing the control calculation based on input data (transmission) 182 for one control period 10 received from PLC 100, and transmits output data (reception) 183 to PLC 100. Also in this case, output data (reception) 183 for future N control periods 10 can be created every control period 10 by the parallel execution of UPGs 69 with multiprocessing. PLC 100 can acquire output data (reception) 183 for future N control periods 10 every control period 10. As a result, for example, even when a data communication error occurs in certain control period 10, the control variable and the manipulated variable of output data 163 based on predicted output data (reception) 183 received in past control period 10 can be output to field device 90. It is therefore possible to handle, even in this case, the communication error.

I. Setting Aside Preparation Time

According to the present embodiment, server 600 can execute other program 611 for performing other processing different from the control calculation processing of UPG 69. The other processing includes, for example, but not limited to, management of log data. Server 600 performs, within control period 10, the other processing by executing other program 611 outside a period of time in which the control calculation processing is performed.

According to the present embodiment, server 600 performs the other processing in a period of time in which PLC 100 performs IO refresh processing 72. Further, upon the end of IO refresh processing 72, server 600 performs preparation processing of allocating a resource for executing UPG 69 using input data (transmission) 182 from PLC 100. Here, a period of time required for this preparation processing is referred to as "preparation time". Note that it is assumed that the preparation time is measured and set (stored) in advance.

Figure 20:
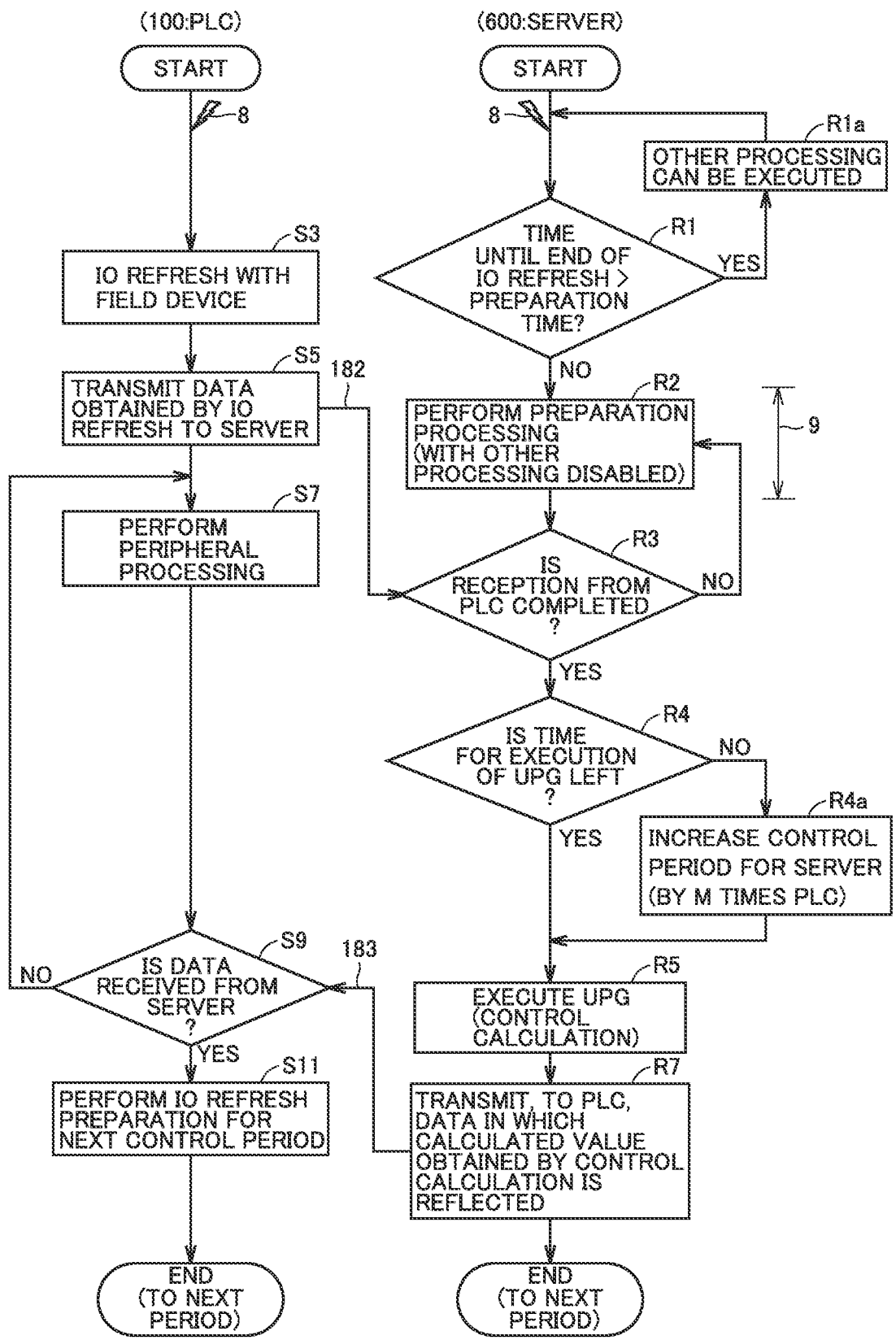
FIG. 20 is a diagram illustrating a modification of the flowchart of processing in the basic system according to the present embodiment.

FIG. 20 is a diagram illustrating a modification of the flowchart of processing in the basic system according to the present embodiment. The flowchart in FIG. 20 is a flowchart obtained as a result of adding steps R1, R1a, R2, R4, and R4a to the flowchart in FIG. 9. A description will be given below of the added processing, and no redundant description will be given of details of the other processing that is the same as in FIG. 9.

Referring to FIG. 20, PLC 100 performs processing the same as in FIG. 9. In response to trigger 8 received at the start of control period 10, server 600 determines whether "preparation time 9" can be set aside by using reserve program 612 (step R1). Specifically, reserve program 612 measures a remaining time in a time required from the reception of trigger 8 to the end of IO refresh processing 72, compares the measured remaining time with the preparation time, and determines whether a condition (remaining time>preparation time) is satisfied based on a result of the comparison. According to the present embodiment, the period of time required for IO refresh processing 72 is set (stored) in advance.

When reserve program 612 determines that the above-described condition is satisfied (YES in step R1), that is, when there is a sufficient time left until the end of IO refresh processing 72, other program 611 can be executed (step R1a). On the other hand, when reserve program 612 determines that the above-described condition is not satisfied (NO in step R1), that is, when IO refresh processing 72 is about to end, server 600 performs the preparation processing (step R2). Therefore, server 600 can perform this preparation processing within preparation time 9.

As described above, in server 600, reserve program 612 calculates (predicts) the reception start time of input data (transmission) 182 (that is, the end time of IO refresh processing 72) based on the reception time of trigger 8 and the period of time required for IO refresh processing 72, and performs the preparation processing for the control calculation processing within a certain period of time (preparation time 9) that is earlier than the predicted reception start time.

Specifically, in the preparation processing, processing engine 610 stops the execution of other program 611 to disable the other processing, and starts communication program 64. This allows the resource of server 600 to be set aside for the subsequent execution of UPG 69 within "preparation time" thus set aside.

Communication program 64 thus started receives input data (transmission) 182 from PLC 100, and step R2 is performed until the reception is completed (NO in step R3).

When it is determined that communication program 64 has received input data (transmission) 182 (YES in step R3), processing engine 610 determines whether a period of time in which UPG 69 can be executed remains in control period 10 (step R4). Processing engine 610 calculates the executable remaining time by using an expression of (A−(B−C)−D−E). Note that a variable A indicates the length of control period 10, a variable B indicates the time when server 600 has received input data (transmission) 182, a variable C indicates the start time of control period 10, a variable D indicates the communication time required for output data (reception) 183 from server 600 to PLC 100, and a variable E indicates the period of time required for peripheral processing 74 of PLC 100. Note that the communication time indicated by variable D indicates a value calculated in advance by experiment or the like.

Processing engine 610 determines whether a condition of (executable remaining time>period of time required for control calculation processing by the UPG) is satisfied (step R4). Note that the period of time required for the control calculation processing by the UPG indicates a value calculated in advance by experiment.

When determining that the above-described condition is satisfied (YES in step R4), processing engine 610 executes UPG 69 (step R5), but when determining that the condition is not satisfied (NO in step R4), processing engine 610 changes control period 10 of server 600 by M times (step R4a). For example, as illustrated in FIG. 17, processing engine 610 increases the control period of server 600, so that UPG 69 is executed once based on input data (transmission) 182 for three (when M=3) control periods 10. When changing control period 10 by M times, server 600 notifies PLC 100 that the control period is changed by M times. In response to the received notification, PLC 100 starts to collect input data (transmission) 182 for M control periods 10 (M>1) in, for example, next control period 10 and transmits input data (transmission) 182 to server 600. The value M may be determined based on the calculated executable remaining time. Note that, in FIG. 20, steps R4 and R4a can be optionally provided.

As described above, since server 600 can predict the time at which input data (transmission) 182 arrives from PLC 100, it is possible to disable the other processing and prepare a resource for executing UPG 69 using received input data (transmission) 182 within the preparation time that is a fixed period of time earlier than the predicted arrival time. Server 600 performs scheduling for setting aside "preparation time" in order to execute UPG 69. Therefore, even when server 600 executes UPG 69, the possibility that PLC 100 can reliably acquire output data (reception) 183 within each control period 10 can be increased.

J. Modification of Processing of Multiplex System

Figure 21:
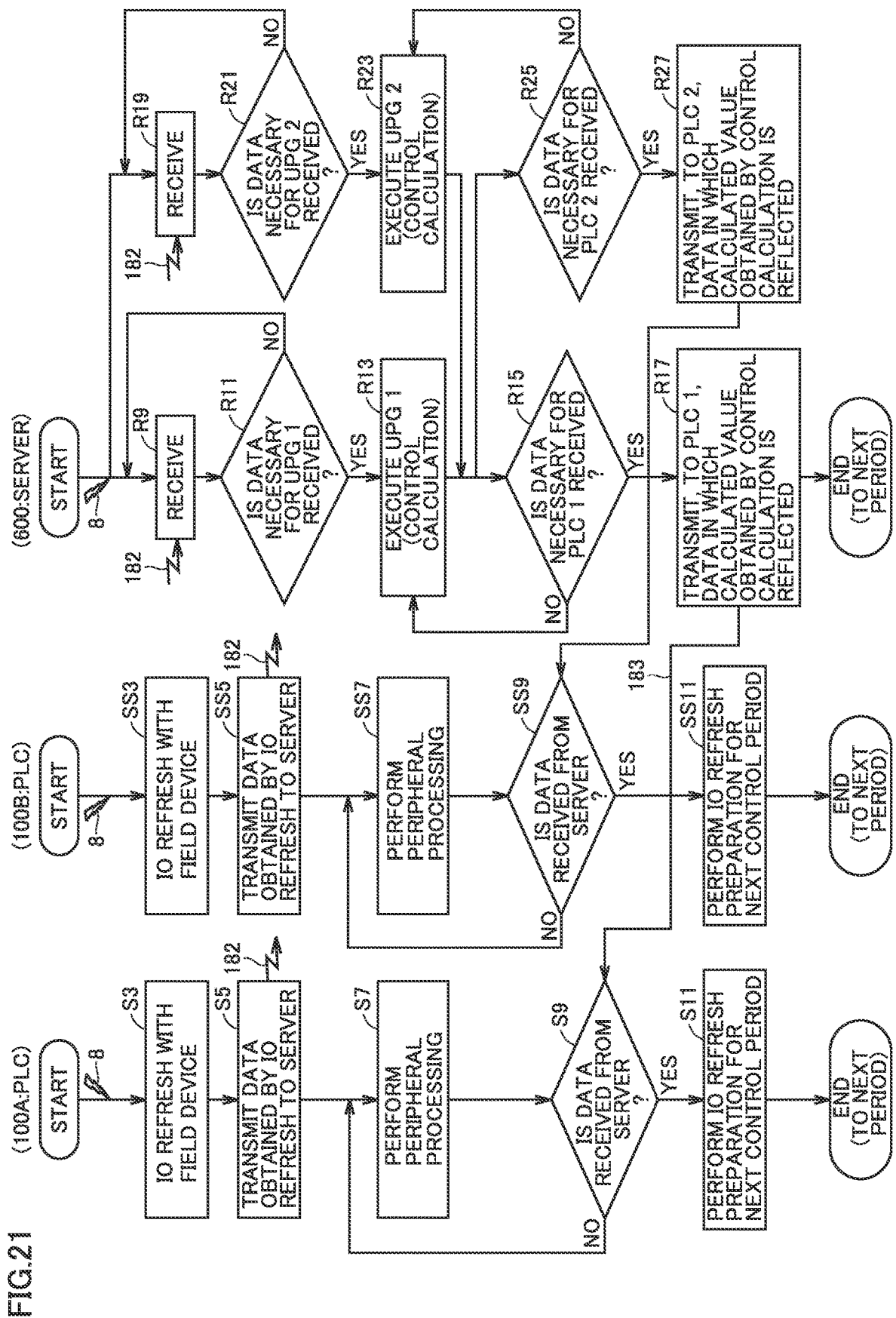
FIG. 21 is a diagram illustrating a modification of the flowchart of processing in the multiplex system according to the present embodiment.

FIG. 21 is a diagram illustrating a modification of the flowchart of processing in the multiplex system according to the present embodiment. In FIGS. 12 to 14 described above, server 600 starts UPG 69 ("UPG 1" and "UPG 2") upon the completion of reception of input data (transmission) 182 for both "UPG 1" and "UPG 2" of UPG 69. On the other hand, as described in this modification, it is also possible to start UPG 69 upon the completion of reception of input data (transmission) 182 for each UPG 69. For example, when "UPG 1" and "UPG 2" are configured not to exchange data with each other, server 600 can separately execute "UPG 1" and "UPG 2".

In FIG. 21, the processing in PLC 100A and the processing in PLC 100B are the same as illustrated in FIG. 13, and thus no redundant description will be given of the processing. In server 600, "UPG 1" for performing the control calculation processing for PLC 100A and "UPG 2" for performing the control calculation processing for PLC 100B are executed in parallel. Note that, also in the processing in FIG. 21, the processing of setting aside the "preparation time" or the processing of increasing control period 10 illustrated in FIG. 20 may be performed.

First, in order to execute "UPG 1", processing engine 610 receives input data (transmission) 182 from PLC 100A by using communication program 64 (step R9), and processing engine 610 determines whether the reception of input data (transmission) 182 for the variable of "UPG 1" is completed (step R 11). Specifically, processing engine 610 extracts an input variable from "UPG 1", and determines whether the reception of data corresponding to all the extracted input variables is completed. When determining that the reception of input data (transmission) 182 is not completed (NO in step R 11), processing engine 610 repeats step R9.

On the other hand, when determining that the reception of input data (transmission) 182 for "UPG 1" is completed (YES in step R 11), processing engine 610 executes "UPG 1" (step R 13). Processing engine 610 determines whether the calculation of output data (reception) 183 necessary for PLC 100A is completed (step R 15). Specifically, processing engine 610 extracts all output variables from "UPG1", and determines whether the calculation of values corresponding to all the extracted output variables by execution of "UPG1" is completed. When determining that the calculation of output data (reception) 183 necessary for PLC 100A is not completed (NO in step R 15), processing engine 610 keeps "UPG 1" running (step R 13).

On the other hand, when determining that the calculation of output data (reception) 183 necessary for PLC 100A is completed (YES in step R 15), processing engine 610 transmits calculated output data (reception) 183 to PLC 100A (step R 17).

Likewise, in order to execute "UPG 2" for PLC 100B, processing engine 610 performs steps R19, R21, R23, R25, and R27. Such steps are the same as steps R9, R11, R13, R15, and R17, and thus no redundant description will be given of the steps.

In the processing in FIG. 21, "UPG 1" and "UPG 2" are each started upon the completion of reception of corresponding input data (transmission) 182 without waiting for the completion of reception of input data (transmission) 182 for the other program. This can eliminate the need for the waiting time 14 illustrated in FIG. 12, and server 600 can complete the control calculation processing for PLC 100 within control period 10 accordingly.

(j1. Mode Setting)

According to the present embodiment, with respect to the execution of "UPG 1" for PLC 100A and "UPG 2" for PLC 100B, control system 1 includes a mode in which the execution of both the UPGs is started upon the completion of reception of input data (transmission) 182 for both the UPGs as illustrated in FIG. 12 (referred to as a first mode) and a mode in which "UPG 1" and "UPG 2" are each started upon the completion of reception of input data (transmission) 182 from corresponding PLC 100 as illustrated in FIG. 10 (referred to as a second mode). Server 600 is configured to enable either the first mode or the second mode in accordance with an external instruction (user instruction) via support device 500.

Specifically, for example, the "first mode" is set to server 600 when "UPG 1" uses input data (transmission) 182 from PLC 100A and PLC 100B, and the "second mode" is set to server 600 when "UPG 1" uses only input data (transmission) 182 from PLC 100A. For example, the user can set the "first mode" or the "second mode" via the UI provided by support device 500. In connection with the mode setting, support device 500 compares a list of variable names used by "UPG 1" with a list of variable names used by "UPG 2". Support device 500 presents the "first mode" to the user as an option when determining that there is a variable name common to both the lists based on a result of the comparison, and presents the "first mode" or the "second mode" as an option when determining that there is no variable name common to both the lists. The user operates support device 500 to give the external instruction to server 600.

K. Advantages

According to the present embodiment, since UPG 69 is executed in server 600 rather than in PLC 100, a resource (memory) necessary for PLC 100 to execute UPG 69 can be saved as compared with a case where PLC 100 executes UPG 69. Further, since server 600 is provided with the runtime environment of UPG 69, the processor of PLC 100 is not required to have a specification capable of executing UPG 69. Therefore, PLC 100 can achieve, while reducing the cost required for PLC 100, the accuracy (throughput, processing speed, and the like) of the control calculation processing exceeding the specification of its own processor.

Further, since the runtime environment of UPG 69 is provided in server 600, for example, coordinated execution (mutual exchange of data, mutual synchronization, or the like) of UPG 69 corresponding to each PLC 100 can be enabled without requiring data communication between PLCs 100.

Further, server 600 and PLC 100 are time-synchronized with each other, and the processing of automatically increasing control period 10 (step R4*a*) is performed so as to cause IO refresh processing 72 and the control calculation processing of UPG 69 to be performed within, for example, control period 10 that is a shared period of time. This makes it possible to ensure that IO refresh processing 72 and the control calculation processing of UPG 69 are completed within the control period.

Further, in control system 1, server 600 exchanges input data (transmission) 182 and output data (reception) 183 with each PLC 100, so that UPG 69 is automatically associated with each of plurality of PLCs 100.

L. Appendix

The present disclosure includes the following technical ideas.

(Configuration 1)

A control system (1) including one or more control devices (100) and an information processing device (600). In the control system, the information processing device and the one or more control devices are communicatively connected and time-synchronized with each other, the information processing device includes a processor (603) configured to perform control calculation processing (69) of calculating control data (183) in accordance with control calculation based on data (182) received from each of the one or more control devices, each of the control devices includes a controller (102) configured to perform input/output processing (72) of transferring incoming data from a field device (90) to the information processing device and outputting the control data received from the information processing device to the field device, and the control calculation processing and the input/output processing are performed within a period of time (10) based on the time synchronization and shared between each of the control devices and the information processing device.

(Configuration 2)

In the control system according to configuration 1, the processing to be performed by the processor further includes processing (R4*a*) of increasing the shared period of time when a part of the shared period of time in which the control calculation processing is performed is insufficient.

(Configuration 3)

In the control system according to configuration 1 or 2, the shared period of time includes a control period (10), and the input/output processing includes processing (S81, S83) of transferring, in a control period, the incoming data for a plurality of control periods before the control period to the information processing device and outputting the control data for the plurality of control periods received from the information processing device to the field device.

(Configuration 4)

In the control system according to configuration 3, the input/output processing includes processing (S83) of outputting, upon receipt of the control data for the plurality of control periods from the information processing device in a control period, each piece of the control data for the plurality of control periods to the field device in a plurality of control periods after the control period.

(Configuration 5)

In the control system according to configuration 1 or 2, the shared period of time includes a control period (10), and the input/output processing includes processing of transferring the incoming data for one control period to the information processing device and outputting the control data for a plurality of control periods to the field device, the control data being received from the information processing device and based on the incoming data.

(Configuration 6)

In the control system according to any one of configurations 1 to 5, the information processing device and each of the control devices start processing in response to a common trigger (8) received within the shared period of time, and the information processing device performs preparation processing (R2) for the control calculation processing within a certain period of time earlier than a reception start time of the data predicted based on a reception time of the trigger and a period of time required for the input/output processing.

(Configuration 7)

In the control system according to configuration 6, the preparation processing includes processing of disabling information processing other than the control calculation processing.

(Configuration 8)

In the control system according to any one of configurations 1 to 7, a plurality of the control devices are communicatively connected to the information processing device, the control calculation processing includes a plurality of pieces of control calculation processing each provided for a corresponding one of the plurality of control devices, and the processor has a first mode in which the processor starts the plurality of pieces of control calculation processing upon receipt of data from the plurality of control devices, or a second mode in which the processor starts, upon receipt of data from one of the plurality of control devices, the control calculation for the control device.

(Configuration 9)

In the control system according to configuration 8, when the processor has the first mode and the second mode, the processor enables either the first mode or the second mode in accordance with an external instruction.

(Configuration 10)

In the control system according to any one of configurations 1 to 9, a plurality of the field devices are connected to each of the control devices over a field network (110), and in the input/output processing, the controller collects the incoming data from the plurality of field devices and transfers the control data received from the information processing device to the plurality of field devices over the field network.

(Configuration 11)

In the control system according to any one of configurations 1 to 9, a plurality of the control devices are communicatively connected to the information processing device and include a control device serving as an active system and a control device serving as a standby system, the control device serving as the standby system is put into operation at a predetermined timing, and the information processing device switches from data communication with the control device serving as the active system to data communication with the control device serving as the standby system at the predetermined timing.

It should be understood that the embodiments disclosed herein are illustrative in all respects and not restrictive. The scope of the present invention is defined by the claims rather than the above description and is intended to include the claims, equivalents of the claims, and all modifications within the scope.

REFERENCE SIGNS LIST

1: Control system, 7, 8: Trigger, 9: Preparation time, 10: Control period, 11, 110: Network, 12, 13: Data storage time, 14: Waiting time, 15: Time, 61: Reception data area, 62: Transmission data area, 63: Scheduler, 64: Communication program, 65, 179: Monitoring program, 66, 178: Abnormality processing program, 151: System program, 67, 177: Time synchronization program, 68: Server program, 72: Refresh processing, 73: Server communication, 74: Peripheral processing, 90, 90A to 901: Field device, 91A to 911, 101A, 101B, 101C, 102A, 102B, 102C, 601: Timer, 150: Control engine, 152: Control program, 154: Peripheral processing program, 156: IO refresh, 158: Transfer program, 160: Variable management program, 161: Device variable, 162: Input data, 163: Output data, 170: Scheduler program, 172: Input program, 174: Output program, 180: Buffer, 185: Instruction signal, 194: Gateway program, 200: Switch, 500: Support device, 600: Server, 610: Processing engine, 612: Reserve program

The invention claimed is:

1. A control system comprising:
one or more control devices; and
an information processing device, wherein
the information processing device and the one or more control devices are communicatively connected over a first network,
each of the one or more control devices and a field device are communicatively connected over a second network different from the first network,
the information processing device includes (i) a first timer, (ii) a processor configured to perform control calculation processing of calculating control data in accordance with control calculation based on data received from each of the one or more control devices, and (iii) a storage for storing a server program configured to be executed by the processor,
each of the one or more control devices includes a second timer, and a controller configured to perform input/output processing of transferring incoming data from the field device to the information processing device and outputting the control data received from the information processing device to the field device,
the field device includes a third timer,
the control system is configured to perform a synchronization management to time- synchronize the first timer, the second timer, and the third timer with each other, and
the control calculation processing and the input/output processing are performed within a period of time based on the time synchronization and shared between each of the one or more control devices and the information processing device,
wherein the shared period of time includes a control period,
wherein the processing to be performed by the processor further includes processing of changing the shared the control period by M (M>1) times when a part of the shared control period in which the control calculation processing is performed is insufficient, and notifying the one or more control devices that the shared control period is changed by M times, and
wherein the input/output processing includes processing of starting, in response to the notification from the information processing device, to collect the incoming data from the field device for M control periods (M>1) and transmit the collected the incoming data to the information processing device.

2. The control system according to claim 1, wherein
the input/output processing includes processing of transferring, in the control period, the incoming data for a plurality of control periods before the control period to the information processing device and outputting the control data for the plurality of control periods received from the information processing device to the field device.

3. The control system according to claim 2, wherein
the input/output processing includes processing of outputting, upon receipt of the control data for the plurality of control periods from the information processing device in the control period, each piece of the control data for the plurality of control periods to the field device in a plurality of control periods after the control period.

4. The control system according to claim 1, wherein
the input/output processing includes processing of transferring the incoming data for one control period to the information processing device and outputting the control data for a plurality of control periods to the field device, the control data being received from the information processing device and based on the incoming data.

5. The control system according to claim 4, wherein
the input/output processing includes processing of outputting, upon receipt of the control data for the plurality of control periods from the information processing device in the control period, each piece of the control data for the plurality of control periods to the field device in a plurality of control periods after the control period.

6. The control system according to claim 1, wherein
the information processing device and each of the control devices start processing in response to a common trigger received within the shared period of time, and
the information processing device performs preparation processing for the control calculation processing within a certain period of time earlier than a reception start time of the data predicted based on a reception time of the trigger and a period of time required for the input/output processing.

7. The control system according to claim 6, wherein
the preparation processing includes processing of disabling information processing other than the control calculation processing.

8. The control system according to claim 1, wherein
a plurality of the control devices are communicatively connected to the information processing device, the control calculation processing includes a plurality of pieces of control calculation processing each provided for a corresponding one of the plurality of control devices, and the processor has a first mode in which the processor starts the plurality of pieces of control calculation processing upon receipt of data from the plurality of control devices, or a second mode in which the processor starts, upon receipt of data from one of the plurality of control devices, the control calculation for the control device.

9. The control system according to claim 8, wherein when the processor has the first mode and the second mode, the processor enables either the first mode or the second mode in accordance with an external instruction.

10. The control system according to claim 1, wherein a plurality of the field devices are connected to each of the control devices over a field network, and in the input/output processing, the controller collects the incoming data from the plurality of field devices and transfers the control data received from the information processing device to the plurality of field devices over the field network.

11. The control system according to claim 1, wherein a plurality of the control devices are communicatively connected to the information processing device and include a control device serving as an active system and a control device serving as a standby system, the control device serving as the standby system is put into operation at a predetermined timing, and the information processing device switches from data communication with the control device serving as the active system to data communication with the control device serving as the standby system at the predetermined timing.

* * * * *